(12) United States Patent
Yoshida

(10) Patent No.: US 9,001,363 B2
(45) Date of Patent: Apr. 7, 2015

(54) PRINTING CONTROL SYSTEM, PRINTING CONTROL METHOD, AND IMAGE PROCESSOR

(71) Applicant: Tomoki Yoshida, Kanagawa (JP)

(72) Inventor: Tomoki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 155 days.

(21) Appl. No.: 13/625,046

(22) Filed: Sep. 24, 2012

(65) Prior Publication Data
US 2013/0077130 A1 Mar. 28, 2013

(30) Foreign Application Priority Data
Sep. 27, 2011 (JP) .................. 2011-211116

(51) Int. Cl.
G06F 3/12 (2006.01)
G06K 15/02 (2006.01)
H04N 1/00 (2006.01)
H04N 1/32 (2006.01)
H04M 11/00 (2006.01)

(52) U.S. Cl.
CPC ............ *G06K 15/02* (2013.01); *H04N 1/00233* (2013.01); *H04N 1/00244* (2013.01); *H04N 1/32128* (2013.01); *H04N 2201/001* (2013.01); *H04N 2201/3278* (2013.01); *H04N 2201/3222* (2013.01); *H04N 2201/0065* (2013.01); *H04N 2201/0082* (2013.01); *G06F 3/1206* (2013.01); *G06F 3/1247* (2013.01); *G06F 3/1288* (2013.01); *G06F 3/1292* (2013.01)

(58) Field of Classification Search
CPC ..... G06F 3/1226; G06F 3/1247; G06F 3/129; G06F 21/6218; G06F 21/33
See application file for complete search history.

(56) References Cited

U.S. PATENT DOCUMENTS

| 6,961,411 | B2 * | 11/2005 | Toyoda et al. ............ 379/100.13 |
| 2008/0133560 | A1 * | 6/2008 | Ferlitsch ........................ 707/101 |
| 2009/0051962 | A1 * | 2/2009 | Asai et al. ...................... 358/1.15 |
| 2009/0122338 | A1 * | 5/2009 | Yoshida ......................... 358/1.15 |
| 2010/0231968 | A1 * | 9/2010 | Hirasawa et al. ............. 358/1.15 |

FOREIGN PATENT DOCUMENTS

| JP | 2009-294889 | 12/2009 |
| JP | 2010-072871 | 4/2010 |

* cited by examiner

*Primary Examiner* — Fred Guillermety
*Assistant Examiner* — Henok A Shiferaw
(74) *Attorney, Agent, or Firm* — IPUSA, PLLC

(57) ABSTRACT

A printing control system includes a transmission part configured to transmit data from an information terminal to an image processor; an analysis part configured to analyze the data received from the information terminal; a format determining part configured to determine the data format of the received data based on the analysis result of the analysis part; a conversion requesting part configured to, in response to the format determining part determining that the data format of the received data is convertible into print data printable in the image processor, transmit the received data to a data converter and request the data converter to convert the received data into the print data; and a printing control part configured to print the print data returned from the data converter in response to the request of the conversion requesting part.

10 Claims, 17 Drawing Sheets

| IDENTIFICATION | CONVERTIBLE FORMAT (EXTENSION LIST) | CONVERSION FORMAT (PDL LIST) |
|---|---|---|
| DATA CONVERTER (A) | ( doc, xls, ppt, txt ) | ( rpsc, ps, pcl, pdf ) |
| DATA CONVERTER (B) | ( doc, xls, ppt ) | ( ps ) |
| DATA CONVERTER (C) | ( doc, xls, ppt ) | ( pcl ) |
| DATA CONVERTER (D) | ( html ) | ( rpcs, ps, pcl ) |

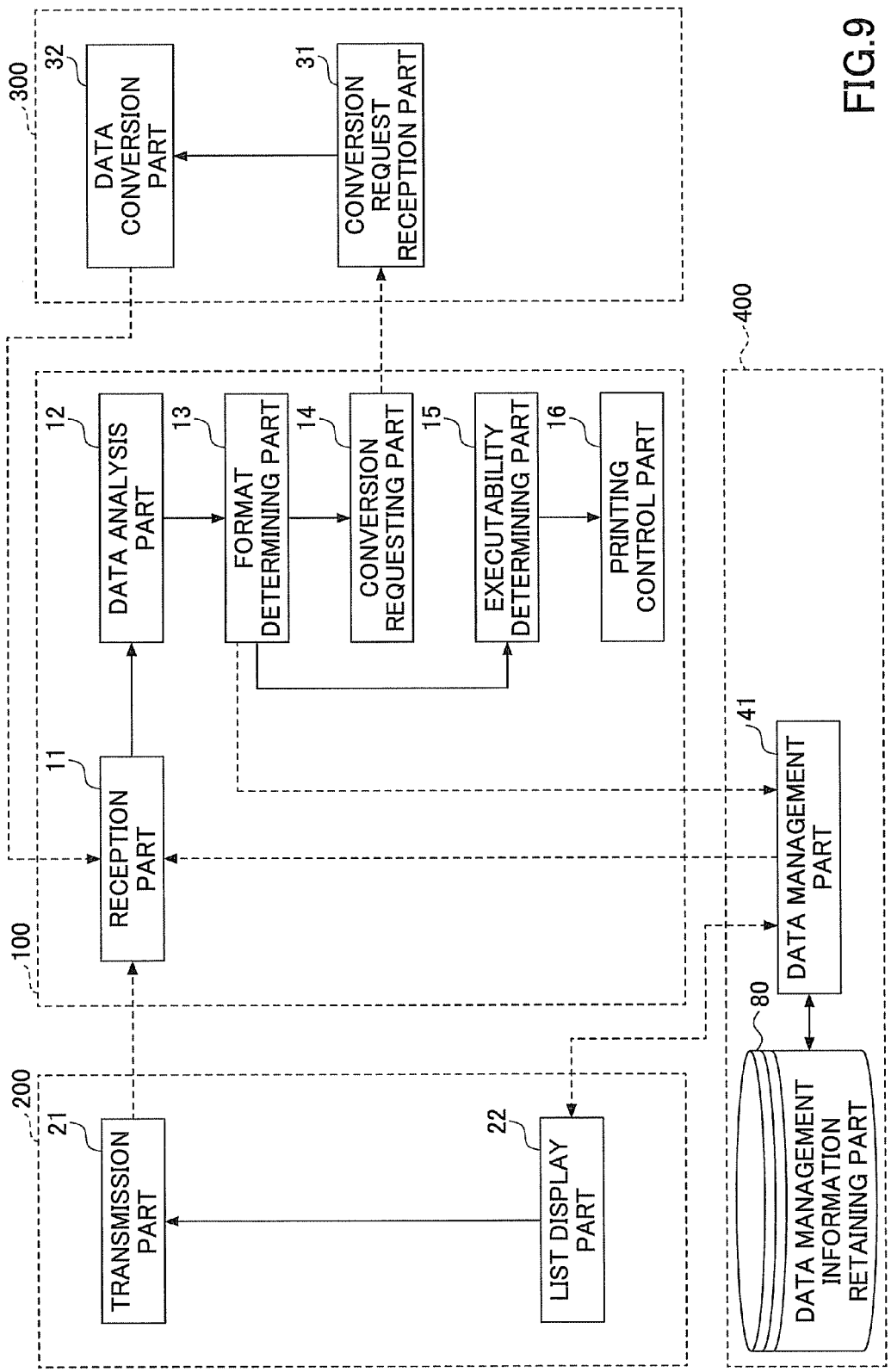

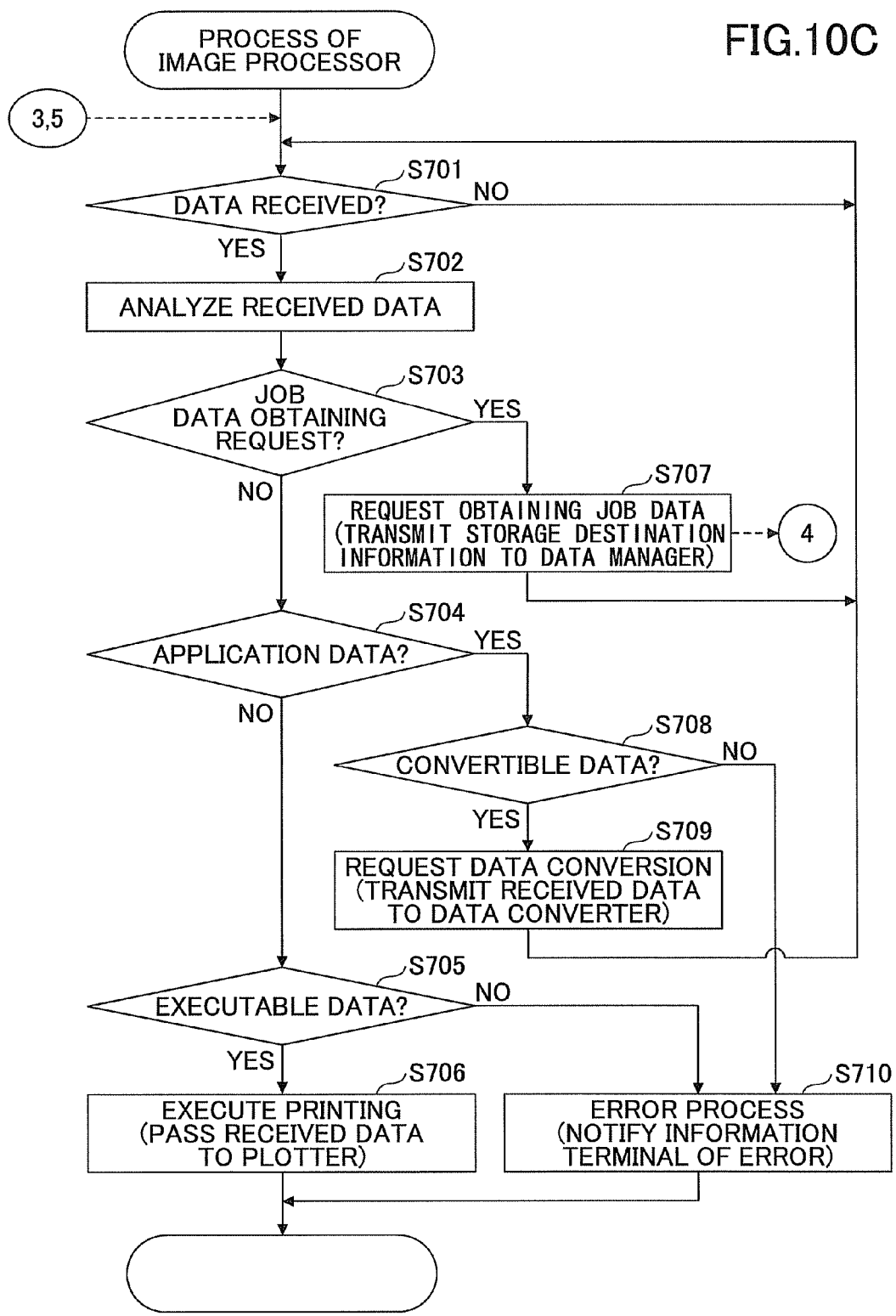

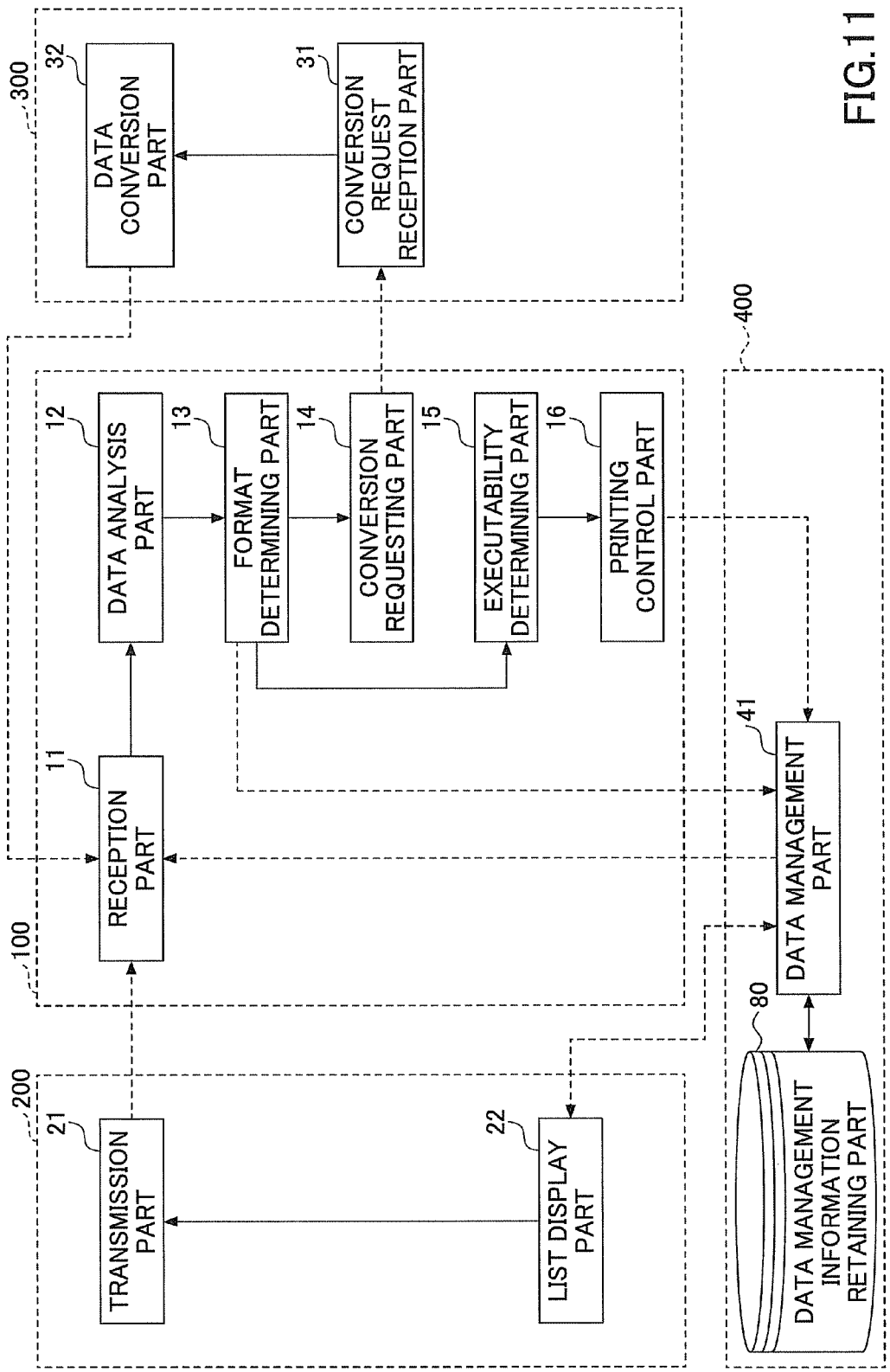

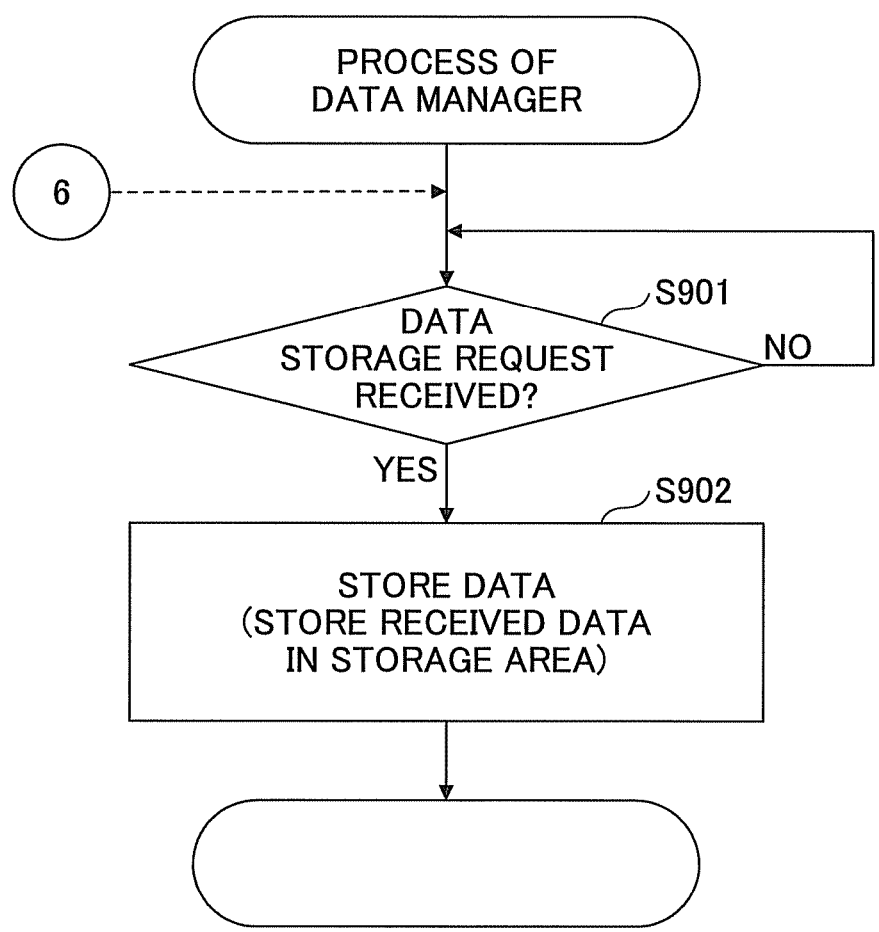

PRINTING CONTROL SYSTEM, PRINTING CONTROL METHOD, AND IMAGE PROCESSOR

CROSS-REFERENCE TO RELATED APPLICATION

The present application is based upon and claims the benefit of priority of the prior Japanese Patent Application No. 2011-211116, filed on Sep. 27, 2011, the entire contents of which are incorporated herein by reference.

BACKGROUND OF THE INVENTION

1. Field of the Invention

The present invention relates to a technique for controlling printing.

2. Description of the Related Art

For example, Japanese Laid-Open Patent Application No. 2009-294889 discloses the technique of obtaining a stored job retained by a print server from a printer and causing the obtained job to be executed (printed) in the printer. Current printing control systems provide users with a location-free printing service using such a technique.

Recent years have seen information terminals such as smartphones and tablet personal computers (tablet PCs) becoming popular. These information terminals have been increasingly used for not only personal purposes but also business purposes, so that a situation is expected where a request for printing is made through these information terminals to an image processor such as a printer introduced into an office environment.

SUMMARY OF THE INVENTION

According to an aspect of the present invention, a printing control system includes a transmission part configured to transmit data from an information terminal to an image processor; an analysis part configured to analyze the data received from the information terminal; a format determining part configured to determine a data format of the received data based on an analysis result of the analysis part; a conversion requesting part configured to, in response to the format determining part determining that the data format of the received data is convertible into print data printable in the image processor, transmit the received data to a data converter and request the data converter to convert the received data into the print data; and a printing control part configured to print the print data returned from the data converter in response to the request of the conversion requesting part.

According to an aspect of the present invention, a printing control method includes transmitting data from an information terminal to an image processor; analyzing the data received from the information terminal; determining a data format of the received data based on an analysis result of said analyzing; transmitting, in response to said determining determines that the data format of the received data is convertible into print data printable in the image processor, the received data to a data converter and requesting the data converter to convert the received data into the print data; and printing the print data returned from the data converter in response to said requesting.

According to an aspect of the present invention, an image processor includes an analysis part configured to analyze data received from an information terminal; a format determining part configured to determine a data format of the received data based on an analysis result of the analysis part; a conversion requesting part configured to, in response to the format determining part determining that the data format of the received data is convertible into print data printable in the image processor, transmit the received data to a data converter and request the data converter to convert the received data into the print data; and a printing control part configured to print the print data returned from the data converter in response to the request of the conversion requesting part.

The object and advantages of the embodiments will be realized and attained by means of the elements and combinations particularly pointed out in the claims.

It is to be understood that both the foregoing general description and the following detailed description are exemplary and explanatory and not restrictive of the invention.

BRIEF DESCRIPTION OF THE DRAWINGS

Other objects, features and advantages of the present invention will become more apparent from the following detailed description when read in conjunction with the accompanying drawings, in which:

FIG. 6 is a diagram illustrating example data of control information according to the variation of the first embodiment of the present invention;

FIG. 9 is a block diagram illustrating a configuration of a printing control function according to the second embodiment of the present invention;

FIGS. 10A, 10B, and 10C are flowcharts illustrating an operating procedure of printing control according to the second embodiment of the present invention;

FIG. 11 is a block diagram illustrating a configuration of a printing control function according to a variation of the second embodiment of the present invention; and FIGS. 12A and 12B are flowcharts illustrating an operating procedure of printing control according to the variation of the second embodiment of the present invention.

DETAILED DESCRIPTION OF THE PREFERRED EMBODIMENTS

According to the conventional system, however, it is a prerequisite that information terminals have a data conversion function (a rendering function) that converts application data into printable data (print data), such as a printer driver. Further, at the time of requesting printing, it is necessary for users to determine and make a conscious use of a data conversion function that corresponds to an image processor that is a specified print destination. It causes trouble to users and eliminates the convenience of a location-free printing service to install software that provides a data conversion function in information terminals or to use a data conversion function in accordance with a print destination.

Therefore, it is desired that the printing control system allow a user to perform location-free printing from an information terminal with a data conversion function that depends on a print destination being transparent to the user.

According to an aspect of the present invention, a printing control system, a printing control method, and an image processor are provided that make it possible to perform location-free printing without being conscious of a data conversion function that depends on a print destination.

A description is given below, with reference to the accompanying drawings, of embodiments of the present invention.

First Embodiment

System Configuration

Figure 1:
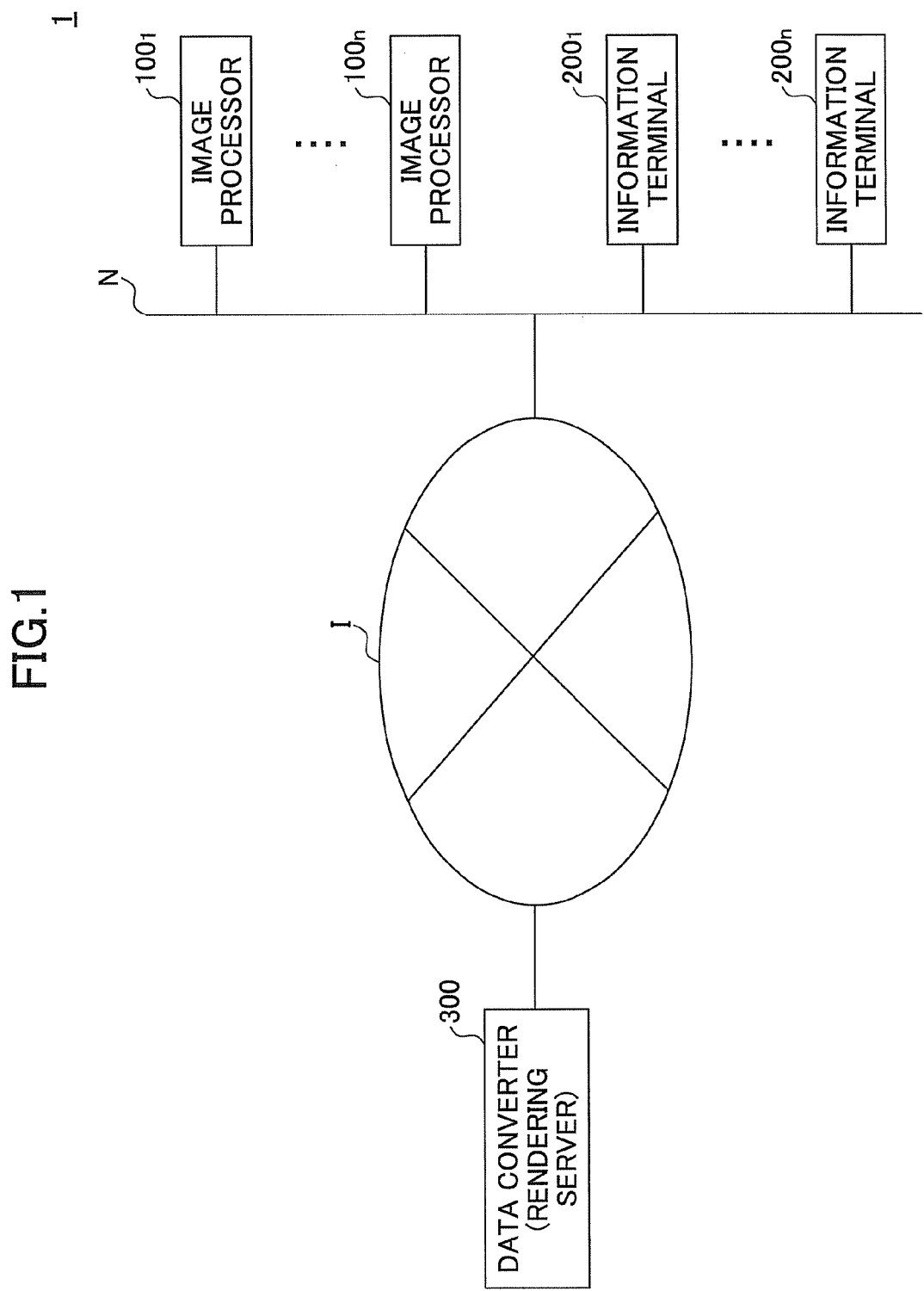
FIG. 1 is a diagram illustrating a configuration of a printing control system according to a first embodiment of the present invention.

FIG. 1 is a diagram illustrating a configuration of a printing control system 1 according to a first embodiment.

FIG. 1 illustrates a system configuration where one or more image processors 1001 through 100n (which may be collectively referred to as an "image processor 100") and one or more information terminals 2001 through 200n (which may be collectively referred to as an "information terminal 200") are connected by an internal network N such as a local area network (LAN). Further, FIG. 1 also illustrates the internal network N, to which the image processor 100 and the information terminal 200 are connected, being connected to a data converter 300 via an external network I such as the Internet.

The image processor 100, which has an image processing functions such as printing, is a printer or a multifunction peripheral (MFP). The information terminal 200, which is a portable device having an information processing function, is a smartphone or a tablet PC. The data converter 300, which has a data conversion function that converts received data into data printable in the image processor 100 specified as a print destination (hereinafter referred to as "print data"), is a rendering server.

According to the printing control system 1 of this embodiment, the following printing service is provided through the above-described system configuration.

The information terminal 200 transmits application data (print source data) to the image processor 100, and requests printing. In response, the image processor 100 transmits received data to the data converter 300, and requests the data converter 300 to convert the data into print data. At this point, the image processor 100 specifies its printable data format to the data converter 300.

As a result, the data converter 300 converts received data into print data according to the specified data format, and responds to the data conversion request by transmitting the converted data to the requesting image processor 100. In response, the image processor 100 prints the converted data (print data) received from the data converter 300.

Thus, it is possible for the printing control system 1 according to this embodiment to provide a printing service that may be used from the information terminal 200 that does not have a data conversion function such as a printer driver, for example.

[Hardware Configuration]

Figure 2:
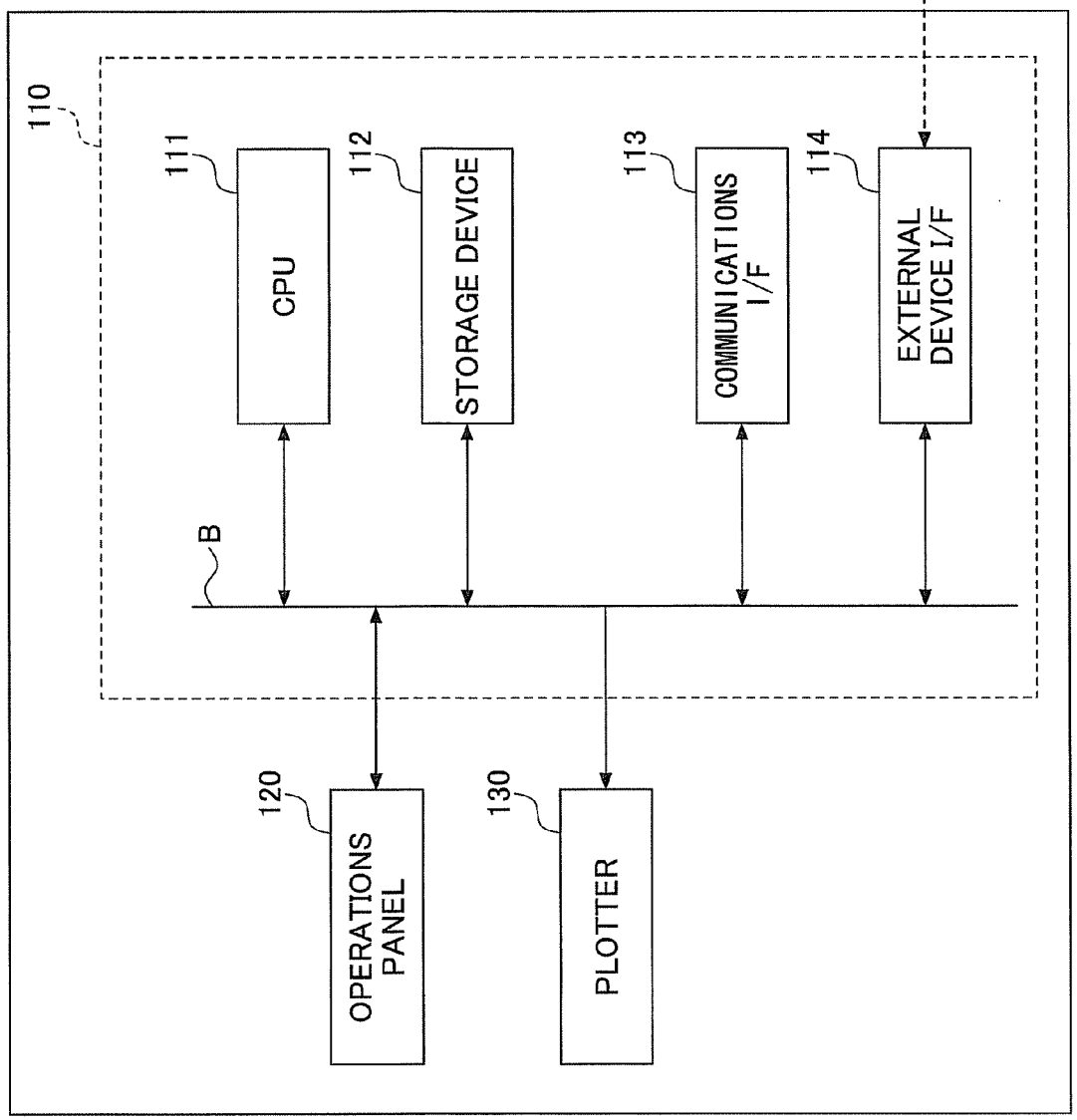
FIG. 2 is a diagram illustrating a hardware configuration of an image processor according to the first embodiment of the present invention.

FIG. 2 is a diagram illustrating a hardware configuration of the image processor 100 according to this embodiment.

As illustrated in FIG. 2, the image processor 100 includes a controller 110, an operations panel 120, and a plotter 130, which are interconnected by a bus B.

The operations panel 120, which includes a display part and an input part, provides various kinds of information to users and receives users' operations such as operation settings and operation instructions. The plotter 130, which includes an image forming part, forms an image of a recording medium such as paper. Examples of systems for forming an image include an electrophotographic process and an inkjet system.

The controller 110 includes a central processing unit (CPU) 111, a storage device 112, a communications interface (I/F) 113, and an external device interface (I/F) 114, which are interconnected by the bus B.

The CPU 111 is a processor that controls the whole apparatus by executing one or more programs. The storage device 112 stores and contains the programs and various kinds of data (such as "image data"). The storage device 112 includes a random access memory (RAM), which is a volatile memory, a read-only memory (ROM), which is a non-volatile memory, and a hard disk drive (HDD) that has a large-capacity storage area. The RAM serves as a work area (a storage area into which programs and data are temporarily read) for the CPU 111. The ROM and the HDD are used as storage destinations in which programs and various kinds of data are stored. Thus, according to the image processor 100, the CPU 111 reads a program stored in the ROM or the HDD into the RAM, and executes the program.

The communications I/F 113 is an interface for connecting the image processor 100 to a predetermined data transmission channel such as a network. Thus, the image processor 100 is allowed to perform data communications with other devices or apparatuses having a communicating function (such as an "information terminal" and a "data converter") via the communications I/F 113.

The external device I/F 114 is an interface for connecting an external device such as a recording medium 114a to the image processor 100. Examples of the recording medium 114a include an SD memory card and a universal serial bus (USB) memory. Thus, the image processor 100 is allowed to read and/or write to the recording medium 114a via the external device I/F 114. For example, a program recorded on the recording medium 114a may be read via the external device I/F 114 and stored in the HDD of the storage device 112. Then, the program may be read from the HDD into the RAM to be executed by the CPU 111.

Thus, in the image processor 100 according to this embodiment, it is possible to provide an image processing service (an image processing function) including a printing function through the above-described hardware configuration.

[Printing Control Function]

A description is given of a printing control function according to this embodiment.

According to the printing control system 1 of this embodiment, the image processor 100 analyzes data received from the information terminal 200, and determines the data format of the received data. If the image processor 100 determines that the data format of the received data is convertible into the print data of the image processor 100 (that is, print data in a data format printable by the image processor 100), the image processor transmits the received data to the data converter 300, and requests the data converter 300 to convert the transmitted data into the print data. As a result, the image processor prints print data received from the data converter 300 when the data converter 300 responds to the request. The printing control system 1 according to this embodiment has such a printing control function.

According to the conventional system, it is necessary for a user to install software that provides a data conversion function in the information terminal 200 and to use the data conversion function in accordance with a print destination, which eliminates the convenience of a location-free printing service.

Therefore, according to the printing control system 1 of this embodiment, the image processor 100 determines the data format of received data, and controls a process for converting the received data into print data (a rendering process) based on the result of the determination.

This allows the printing control system 1 of this embodiment to provide an environment in which the image processor 100 is allowed to print data received from the information terminal 200 having no data conversion function. As a result, according to the printing control system 1 of this embodiment, a user is allowed to perform location-free printing without being conscious of a data conversion function that depends on a print destination.

Next, a description is given of a configuration and an operation of a printing control function according to this embodiment.

Figure 3:
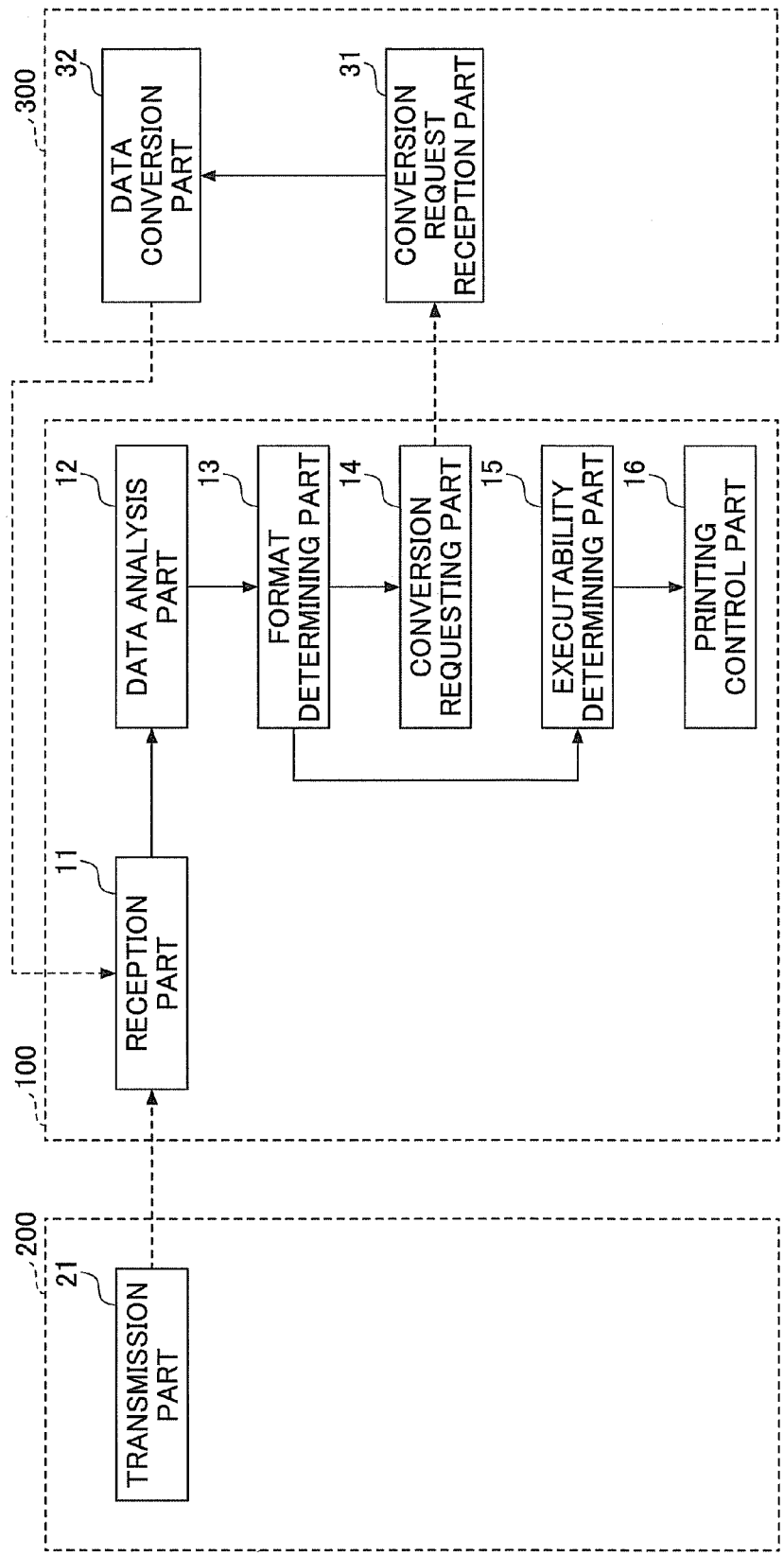
FIG. 3 is a block diagram illustrating a configuration of a printing control function according to the first embodiment of the present invention.

FIG. 3 is a block diagram illustrating a configuration of a printing control function according to this embodiment.

Referring to FIG. 3, the printing control function according to this embodiment includes a transmission part 21, a reception part 11, a data analysis part 12, a format determining part 13, a conversion requesting part 14, an executability determining part 15, a printing control part 16, a conversion request reception part 31, and a data conversion part 32.

The transmission part 21 operates in the information terminal 200. The reception part 11, the data analysis part 12, the format determining part 13, the conversion requesting part 14, the executability determining part 15, and the printing control part 16 operate in the image processor 100. The conversion request reception part 31 and the data conversion part 32 operate in the data converter 300. Thus, the functional parts of the individual apparatuses (100, 200, 300) operate in conjunction with each other, so that the printing control function according to this embodiment works.

In the following, a description is given, in order of the information terminal 200, the data converter 300, and the image processor 100, of their respective functional parts.

[Information Terminal]

The transmission part 21 is a functional part that transmits a print job. For example, in the information terminal 200, an operation screen is displayed that includes a graphical user interface (GUI) that allows a print job to be selected and a print destination to be specified. A user selects a print job on this operation screen, specifies the image processor 100 that is a print destination, and requests printing. In response to this request, the transmission part 21 transmits the job data of the selected print job to the specified image processor 100. The job data transmitted at this point are, for example, application data, and are data before being converted into print data (pre-conversion data). Further, the data are transmitted based on, for example, the network configuration value (Internet protocol [IP] address) of the image processor 100 preset in the information terminal 200.

[Data Converter]

The conversion request reception part 31 is a functional part that receives a request for conversion into print data (a conversion request). The conversion request reception part 31 receives data to be converted (pre-conversion data) from the image processor 100, and receives a conversion request. At this point, the conversion request reception part 31 receives, as well as the data to be converted, the type value of the printing function (page description language [PDL]) of the requesting image processor 100 (hereinafter referred to as "PDL type value").

The data conversion part 32 is a functional part that converts the data to be converted into print data. That is, the data conversion part 32 is a rendering part. The data conversion part 32 specifies a data format after conversion (a print data format) based on the PDL type value received at the time of receiving the conversion request, and converts the received data to be converted into print data of the specified predetermined format (PDL data). The data conversion part 32 responds to the conversion request by transmitting the converted data (print data) to the requesting image processor 100.

[Image Processor]

The reception part 11 is a functional part that receives data transmitted from apparatuses. As described above, the pre-conversion data (application data) are transmitted from the information terminal 200 (the transmission part 21) and the converted data (print data) are transmitted from the data converter 300 (the data conversion part 32). The reception part 11 receives these data.

The data analysis part 12 is a functional part that analyzes the received data. The data analysis part 12 analyzes received data as follows. The data analysis part 12 determines the presence or absence of the extension of the received data, and determines the type of the extension. The extension is a string added to the end of the name of a file (a filename) to identify the type of the file.

The data analysis part 12 first analyzes the string of the filename of the received data to determine the presence or absence of the extension of the received data. (Hereinafter, this process is referred to as "extension presence/absence analysis" for convenience.) If the received data include an extension, then the data analysis part 12 determines the type of the data file from the extension. (Hereinafter, this process is referred to as "extension type analysis" for convenience.) Further, the data analysis part 12 analyzes the header of the received data. (Hereinafter, this process is referred to as "header analysis" for convenience.)

The format determining part 13 is a functional part that determines the data format of the received data. The format determining part 13 determines the data format of the received data based on the result of the data analysis as follows.

First, the format determining part 13 determines whether the received data are in an application data format based on the result of the extension presence/absence analysis. At this point, the format determining part 13 determines that the received data are application data if the received data include an extension. If the received data are application data, the format determining part 13 determines whether the application data are in a data format convertible in the data converter 300 based on the result of the extension type analysis.

If the extension matches a preset extension indicating a convertible data format, the format determining part 13 determines that the received data are in a data format convertible in the data converter 300. The format determining part 13 retains information on the extensions of data formats convertible in the data converter 300 (hereinafter referred to as "convertible format information") as, for example, list data containing one or more strings indicating the extensions of corresponding application files, such as "(doc, xls, ppt, txt)". The format determining part 13 refers to this convertible format information, and determines that the data format is convertible in the data converter 300 if the analyzed extension is an extension set in the convertible format information. If the received data include no extension, the format determining part 13 determines that the received data are print data.

The conversion requesting part 14 is a functional part that requests the data converter 300 (the conversion request reception part 31) to convert the received data into print data. If the received data are application data in a data format convertible in the data converter 300, the conversion requesting part 14 transmits the received data to the data converter 300 as data to be converted (pre-conversion data), and requests data conversion. At this point, the conversion requesting part 14 also transmits the PDL type value (of the requesting image processor 100) to the data converter 300, thereby notifying the data converter 300 of information on a data format printable in the image processor 100 (the data format of the PDL installed in the image processor 100).

The executability determining part 15 is a functional part that determines whether the received data are print data printable in the image processor 100. The executability determining part 15 determines, based on the result of the header analysis, whether the received data determined as print data are printable. For example, in the header analysis, the data analysis part 12 analyzes the header of the data file to determine whether data of "%-12345X" are included in the header, where "%-12345X" is data added to the head of printer job language (PJL) data included in the header of print data. The executability determining part 15 determines that the received data are printable print data if data of "%-12345X" are included in the header of the received data.

The printing control part 16 is a functional part that controls printing of the received data. The printing control part 16 passes the received data determined as printable print data to the plotter 130 (FIG. 2) of the image processor 100, and instructs the plotter 130 to execute printing. As a result, the plotter 130 forms an image based on the received data and prints the image in accordance with preset printing condition settings.

Thus, the printing control function according to this embodiment is implemented by the above-described functional parts operating in conjunction with one another. For example, the printing control function according to this embodiment is implemented by reading a program (software implementing the printing control function) installed in each of the apparatuses (100, 200, 300) of the printing control system 1 from a storage device (such as an HDD or a ROM) into a memory (RAM) and executing the program by a processor (CPU) so that the following process is executed in the apparatuses.

A description is given below, with reference to a flowchart illustrating an operating procedure, of a detailed operation (a conjunct operation of a group of functional parts) of the printing control function according to this embodiment.

Figure 4A:
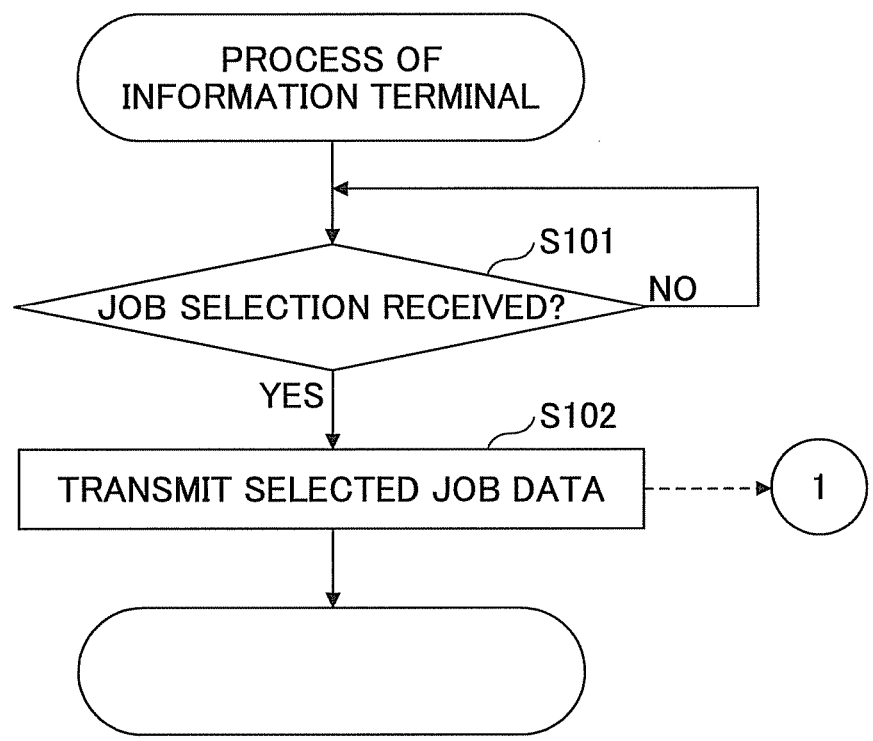
FIGS. 4A, 4B, and 4C are flowcharts illustrating an operating procedure of printing control according to the first embodiment of the present invention.
Figure 4B:
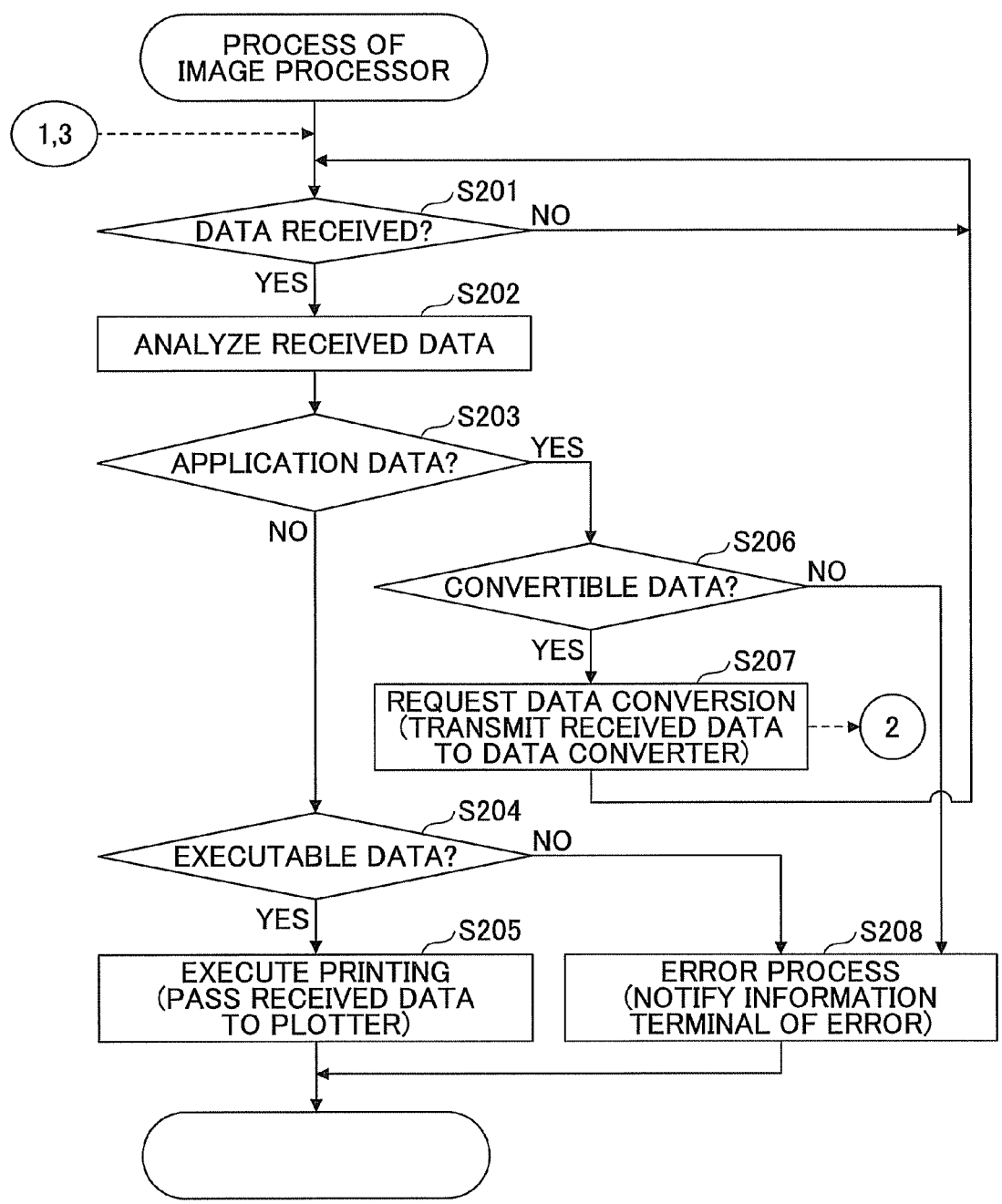
Figure 4C:
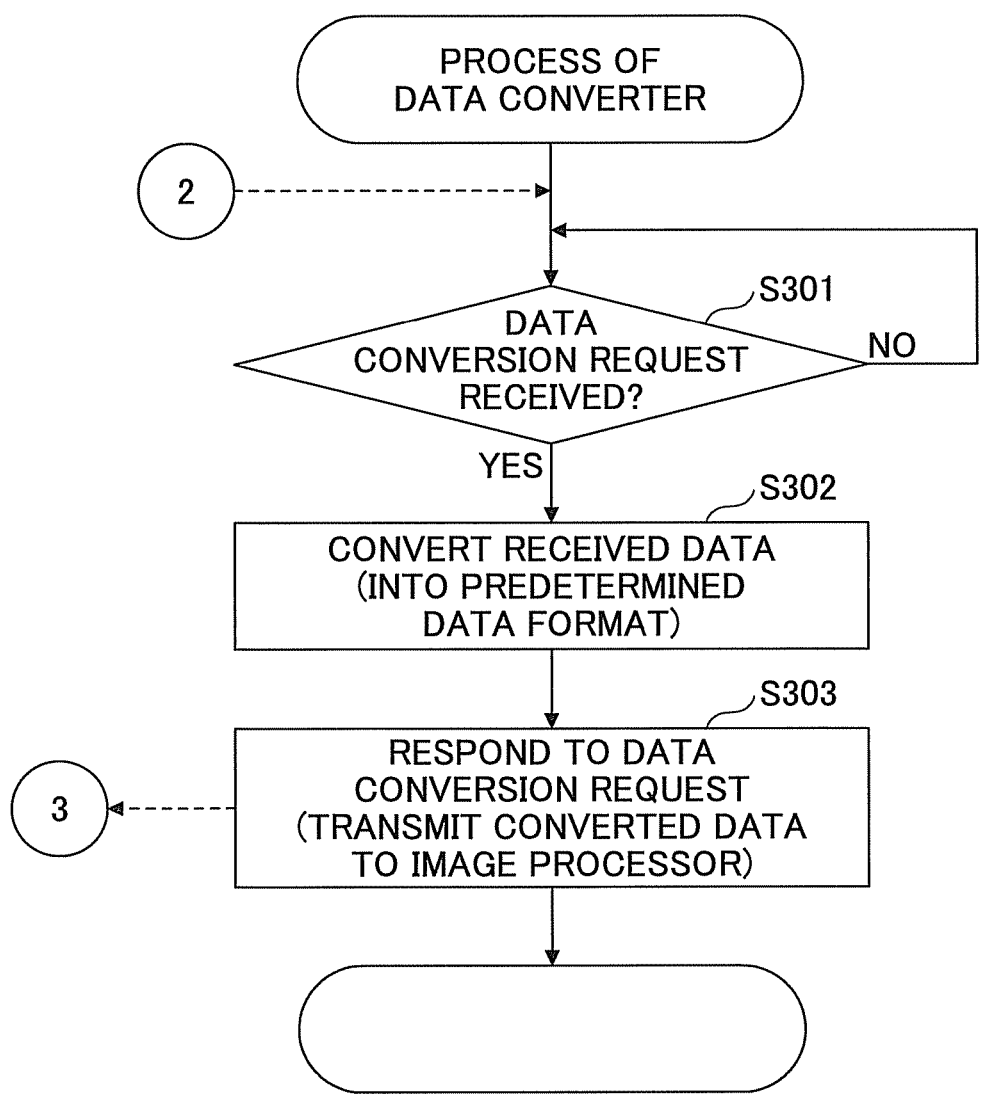

FIGS. 4A, 4B, and 4C are flowcharts illustrating an operating procedure of printing control according to this embodiment.

FIG. 4A illustrates a process of the information terminal 200 in printing control, FIG. 4B illustrates a process of the image processor 100 in printing control, and FIG. 4C illustrates a process of the data converter 300 in printing control.

[Process of Information Terminal]

Referring to FIG. 4A, the information terminal 200 receives selection of a print job on the operation screen (YES in step S101).

In response, in step S102, the information terminal 200 has the transmission part 21 transmit the job data (application data) of the selected print job (selected job) to the image processor 100 specified as a print destination.

Thereby, according to the printing control system 1 of this embodiment, the information terminal 200 requests the image processor 100 to perform printing.

[Process of Image Processor]

Referring to FIG. 4B, in response to receiving data transmitted from the information terminal 200 or the data converter 300 by the reception part 11 (YES in step S201), in step S202, the image processor 100 has the data analysis part 12 analyze the received data. At this point, the data analysis part 12 analyzes the extension and the header of the received data file.

Next, in step S203, the image processor 100 has the format determining part 13 determine whether the received data are application data based on the result of the extension presence/absence analysis of the data analysis part 12.

As a result, if it is determined that the received data do not include an extension and are accordingly not application data (that is, the received data are print data) (NO in step S203), in step S204, the image processor 100 has the executability determining part 15 determine whether the print data as determined are printable data based on the result of the header analysis of the data analysis part 12. At this point, the executability determining part 15 executes the above-described executability (printability) determination based on the result of the header analysis as to whether the header of the received data determined as print data includes predetermined data of "%-12345x."

As a result, if it is determined that the header of the received data determined as print data include "%-12345X" and that the print data are printable data (YES in step S204), in step S205, the image processor 100 has the printing control part 16 perform a process for printing the print data. At this point, the printing control part 16 passes the received data determined as print data to the plotter 130, and instructs the plotter 130 to perform printing. As a result, the plotter 130 forms an image based on the received data and prints the image in accordance with preset printing condition settings.

On the other hand, if it is determined in step S203 that the received data include an extension and are accordingly application data (YES in step S203), in step S206, the image processor 100 has the format determining part 13 determine, based on the result of the extension type analysis of the data analysis part 12, whether the application data are in a data format convertible in the data converter 300. At this point, the format determining part 13 executes the above-described convertible format determination based on the result of the determination as to whether the extension matches an extension set in the preset convertible format information (list data of one or more extensions indicating convertible data formats), referring to the convertible format information based on the analyzed extension.

As a result, if it is determined that the analyzed extension is an extension set in the convertible format information so that the received data determined as application data are in a convertible data format (YES in step S206), in step S207, the information processor 100 has the conversion requesting part 14 transmit the received data determined as convertible application data to the data converter 300 and request the data converter 300 to convert the application data into print data. At this point, the conversion requesting part 14 also transmits the PDL type value of the image processor 100, thereby notifying the data converter 300 of information on a data format printable in the image processor 100.

Thereafter, the image processor 100 proceeds to the above-described process of step S201, and enters the state of waiting for a response to the request from the data converter 300 (the state of waiting for reception of converted data (print data) from the data converter 300).

If it is determined as a result of step S204 that the header of the received data determined as print data does not include predetermined data of "%-12345X" and that the print data are not printable data (NO in step S204), or if it is determined as a result of step S206 that the analyzed extension is not an extension set in the convertible format information so that the received data determined as application data are not in a data format convertible in the data converter 300 (NO in step S206), in step S208, the image processor 100 executes a predetermined error process. Here, the predetermined error process is, for example, to notify the requesting information terminal 200 (that has requested printing) of the details of the error.

Thereby, according to the printing control system 1 of this embodiment, in response to receiving application data from the information terminal 200, the data format of the received data is determined and a process for converting the received data into print data (a rendering process) is controlled based on the result of the determination in the image processor 100.

[Process of Data Converter]

Referring to FIG. 4C, in response to receiving a request for conversion into print data from the image processor 100 by the conversion request reception part 31 (YES in step S301), in step S302, the data converter 300 has the data conversion part 32 converts the received data (application data) into print data. At this point, the data conversion part 32 specifies a data format after conversion (a print data format) based on the PDL type value received at the time of receiving the conversion request, and converts the received data into print data of the specified predetermined format (PDL data).

As a result, in step S303, the data converter 300 responds to the conversion request by having the data conversion part 32 transmit the converted data (print data) to the requesting image processor 100.

Thereby, according to the printing control system 1 of this embodiment, in response to receiving application data from the image processor 100, the data converter 300 has the application data converted into print data interpretable by the PDL installed in the image processor 100 to be returned to the image processor 100.

Thus, the printing control system 1 according to this embodiment provides an environment where data received from the information terminal 200 having no data conversion function may be printed in the image processor 100.

[Variation]

The above-described embodiment assumes a system configuration where the printing control system 1 includes the single data converter 300. On the other hand, load balancing with multiple data converters 300 is a possible method that addresses reduction of processing workload regarding data conversion or conversion into various data formats.

Therefore, as a variation, a mechanism is provided for determining a data converter 300 optimum for performing data conversion from among multiple data converters 300 in the image processor 100.

Thereby, in the variation, an environment where data received from the information terminal 200 having no data conversion function may be printed in the image processor 100 is also provided in an environment where data conversion workload is distributed. As a result, according to the printing control system 1 of this embodiment, a user is allowed to perform location-free printing having no data conversion function that depends on a print destination being transparent to the user also in an environment where data conversion workload is distributed.

In the following, a description is given of differences from the above-described embodiment. The same elements as those described above are referred to by the same reference numerals, and a description thereof is omitted.

[Printing Control Function]

Figure 5:
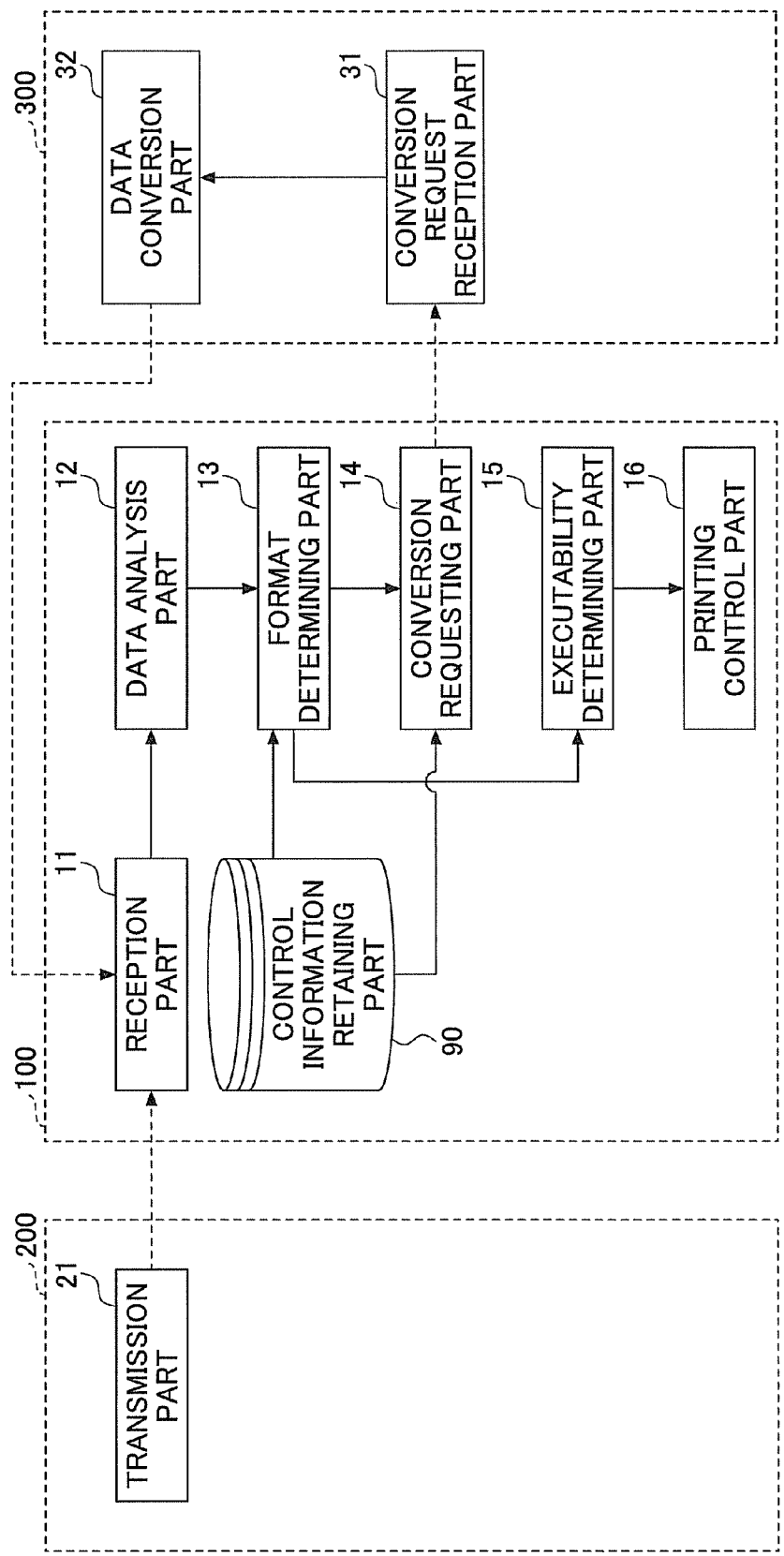
FIG. 5 is a diagram illustrating a configuration of a printing control function according to a variation of the first embodiment of the present invention.

FIG. 5 is a diagram illustrating a configuration of a printing control function according to the variation.

Referring to FIG. 5, the printing control function according to the variation is different from the printing control function according to the above-described first embodiment in that the image processor 100 includes a control information retaining part 90 and the format determining part 13 refers to control information retained in the control information retaining part 90. The control information retaining part 90 corresponds to a predetermined storage area in the storage device 112 (FIG. 2) of the image processor 100.

[Image Processor]

FIG. 6 is a diagram illustrating example data of control information 90D (retained in the control information retaining part 90) according to the variation.

Referring to FIG. 6, the control information 90D contains one or more information sets in which information items such as identification, a convertible format, and a conversion format are correlated with one another, and manages the information sets on a data converter basis.

The "identification" item retains the identification information of the data converter 300. Examples of item values include an identifier (for example, an "apparatus name" or a "network configuration value") uniquely assigned to the data converter 300.

The "convertible format" item retains convertible format information. Examples of item values include list data of extensions including one or more strings indicating the extensions of application data files in data formats convertible in the data converter 300, such as "(doc, xls, ppt, txt)."

The "conversion format" item retains information indicating the data format of print data (converted data) generated in the data converter 300. (Hereinafter, this information is referred to as "conversion format information.") Examples of item values include list data of PDLs including one or more strings indicating the PDL type values of print data generated in the data converter 300, such as "(rpcs, ps, pcl, pdf)."

The control information 90D is preset by an administrator using a predetermined setting tool. Alternatively, the image processor 100 may automatically set the information item values of the control information 90D based on the apparatus information obtained from the data converter 300 by making an information obtaining request to the data converter 300.

Referring back to FIG. 5, the format determining part 13 accesses the control information retaining part 90, and determines the data format of received data based on the control information 90D to which the format determining part 90 has referred and on the result of the data analysis of the data analysis part 12 as follows.

If the received data are application data, the format determining part 13 refers to the convertible format information of the control information 90D and determines whether the application data are in a data format convertible in the data converter 300 based on the result of the extension type analysis. If the extension of the received data matches an extension set in the convertible formation information, the format determining part 13 determines that the received data (application data) are in a data format convertible in the data converter 300.

For example, if the received data are application data of "XXX.doc", the format determining part 13 determines that the data format is convertible in data converters (A), (B), and (C), referring to the control information 90D illustrated in FIG. 6.

Thus, in the data conversion workload balancing (distribution) environment, there are multiple data converters 300 capable of performing data conversion depending on the data format of received data. Therefore, according to this variation, the conversion requesting part 14 accesses the control information retaining part 90, and determines the data converter 300 to request to perform data conversion from among the multiple data converters 300 based on the control information 90D to which the conversion requesting part 14 has referred.

If the format determining part 13 determines that the data format of the received data is convertible in multiple data converters 300, the conversion requesting part 14 refers to the conversion format information correlated with the identification information of the multiple data converters 300 in the control information 90D, and determines whether the print data generated in the multiple data converters 300 are printable in the image processor 100. If a PDL type value set in the conversion format information to which the format requesting part 14 has referred matches the type value of the printing function (PDL) of the image processor 100, the format requesting part 14 determines that the print data are printable in the image processor 100.

If the print data generated in a data converter 300 are printable in the image processor 100, the conversion requesting part 14 determines the data converter 300 as an apparatus (a target or destination data converter) to request to perform data conversion.

For example, if the format determining part 13 determines that the received data are in a data format convertible in the data converters (A), (B), and (C), and the type value of the printing function of the image processor 100 is "rpcs," the conversion requesting part 14 determines the data converter (A) as an apparatus to request to perform data conversion from among the data converters (A), (B), and (C), referring to the control information 90D illustrated in FIG. 6.

That is, if the print data generated in a data converter 300 are not printable in the image processor 100, the conversion requesting part 14 excludes the data converter 300 from apparatuses to request to perform data conversion.

Further, for example, if the format determining part 13 determines that the received data are in a data format convertible in the data converters (A), (B), and (C), and the type value of the printing function of the image processor 100 is "pcl," the conversion requesting part 14 determines the data converters (A) and (C) as (candidate) apparatuses to request to perform data conversion from among the data converters (A), (B), and (C), referring to the control information 90D illustrated in FIG. 6.

Thus, there may be multiple data converters 300 that generate print data printable in the image processor 100. In this case, the conversion requesting part 14 determines the data converter 300 to request to perform data conversion as follows.

The conversion requesting part 14 requests multiple (candidate) data converters 300 to return information, and determines one of the data converters 300 which one has responded quickest to the request as an apparatus to request to perform data conversion. That is, the conversion request part 14 determines, as an apparatus to request to perform data conversion, one of the data converters 300 which one is the lowest in processing workload (including communications workload) when data conversion is requested. In addition to the above-described determination method based on response speed, examples of the method of determining processing workload on data converters 300 include comparing the processing workload values (CPU utilization values) of the data converters 300 included in the apparatus information obtained from the data converters 300.

Further, the conversion requesting part 14 may also determine the data converter 300 to request to perform data conversion as follows. For example, the order of priority of data converters 300 is preset in the control information 90D, and if multiple data converters 300 are determined as candidate apparatuses to request to perform data conversion, the priorities of the data converters 300 are compared, and one of the data converters 300 which has the highest priority is determined as an apparatus to request to perform data conversion.

A description is given below, with reference to a flowchart illustrating an operating procedure executed in the image processor 100, of a detailed operation (a conjunct operation of a group of functional parts) of the printing control function according to the variation.

[Process of Image Processor]

Figure 7:
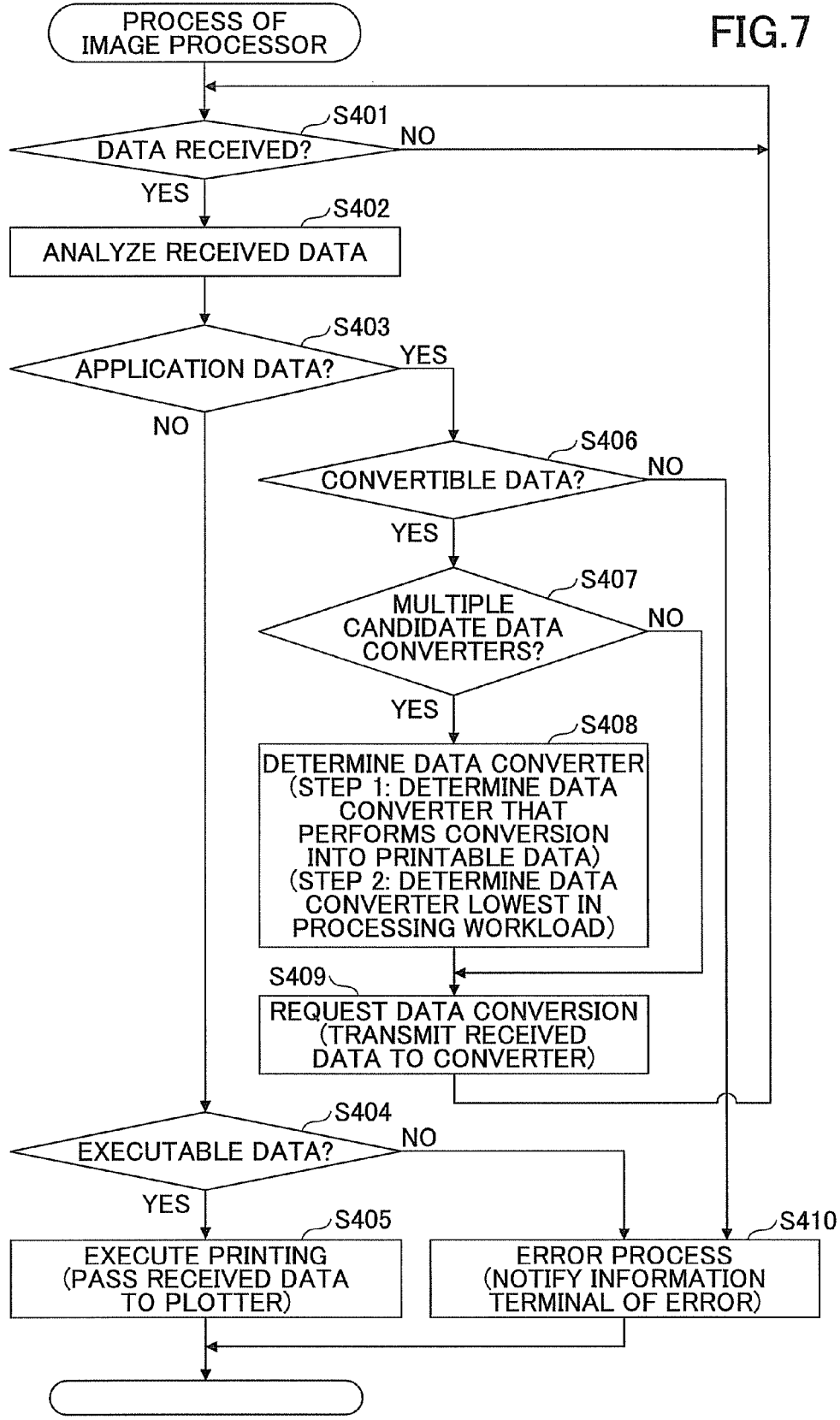
FIG. 7 is a flowchart illustrating an operating procedure of printing control according to the variation of the first embodiment of the present invention.

FIG. 7 is a flowchart illustrating an operating procedure of printing control according to the variation. The process of steps S401 through S405 and S410 illustrated in FIG. 7 is the same as the process of steps S201 through S205 and S208 illustrated in FIG. 4B described in the above embodiment. Accordingly, a description is given below of a different process (steps S406 through S409).

Referring to FIG. 7, if it is determined that the received data include an extension and are accordingly application data (YES in step S403), in step S406, the image processor 100 has the format determining part 13 access the control information retaining part 90 to determine whether the application data are convertible in the data converter 300 based on the control information 90D to which the format determining part has referred and on the result of the extension type analysis of the data analysis part 12. At this point, the format determining part 13 refers to the convertible format information (list data of extensions indicating convertible data formats) of the control information 90D based on the result of the extension type analysis, and performs the above-described convertible format determination based on the result of the determination as to whether the extension of the received data matches an extension set in the convertible format information.

As a result, if it is determined that the analyzed extension is an extension set in the convertible formation information so that the data format is convertible (YES in step S406), in step S407, the conversion requesting part 14 determines whether there are multiple data converters 300 capable of converting the received data determined as convertible.

If it is determined that there are multiple candidate converters 300 (YES in step S407), in step S408, the image processor 100 has the conversion requesting part 14 access the control information retaining part 90 and determine the data converter 300 to request to perform data conversion from among the multiple data converters 300 based on the control information 90D to which the conversion requesting part 14 has referred.

At this point, the conversion requesting part 14 refers to the conversion format information (list data of the PDLs of generated print data) correlated with the identification information of the multiple data converters 300 in the control information 90D, and determines whether a PDL type value set in the conversion format information to which the format requesting part 14 has referred matches the type value of the printing function of the image processor 100. Based on the result of this determination, the conversion requesting part 14 determines whether the print data generated in the data converters 300 are printable in the image processor 100. As a result, if the print data generated in a data converter 300 are printable in the image processor 100, in step S408, the conversion requesting part 14 determines the data converter 300 as an apparatus to request to perform data conversion (STEP 1).

Further, if it is determined that there are multiple data converters 300 that generate print data printable in the image processor 100, in step S408, the conversion requesting part 14 requests the multiple (candidate) data converters 300 to return information, and determines one of the data converters 300 which one has responded quickest to the request as an apparatus to request to perform data conversion (STEP 2).

As a result, in step S409, the image processor 100 has the conversion requesting part 14 transmit the received data determined as convertible application data to the determined data converter 300 and request conversion of the received data (application data) into print data.

If it is determined that there are not multiple candidate data converters 300 (that is, there is a single candidate data converter 300) (NO in step S407), the image processor 100 skips step S408 (a data conversion target apparatus determining process) and proceeds to step S409 (a data conversion requesting process).

Thereby, according to the printing control system 1 of this variation, a data converter 300 optimum for performing data conversion is selected from among multiple data converters 300 in the image processor 100.

Thus, also in an environment where data conversion workload is distributed, the printing control system 1 according to this variation provides an environment where data received from the information terminal 200 having no data conversion function may be printed in the image processor 100.

Thus, according to the printing control system 1 of this embodiment, the image processor 100 has the data analysis part 12 analyze data received from the information terminal 200 and has the format determining part 13 determine the data format of the received data. If it is determined that the received data are in a data format convertible into print data printable in the image processor 100, the image processor 100 has the conversion requesting part 14 transmit the received data to the data converter 300 and request the data converter 300 to convert the received data into print data. As a result, the image processor 100 has the printing control part 16 perform a process for printing the print data received when the data converter 300 responds to the (data conversion) request.

This allows the printing control system 1 according to this embodiment to provide an environment where data received from the information terminal 200 having no data conversion function may be printed in the image processor 100, so that a user may perform location-free printing with a data conversion function that depends on a print destination being transparent to the user.

Second Embodiment

In a second embodiment, a mechanism is provided for letting a job stored in an external storage area by a user as well be a job to be printed. Thereby, according to this embodiment, an environment is provided where a stored job specified from the information terminal 200 having no data conversion function may be printed in the image processor 100.

In the following, a description is given of differences from the first embodiment. The same elements as those described above are referred to by the same reference numerals, and a description thereof is omitted.

[System Configuration]

Figure 8:
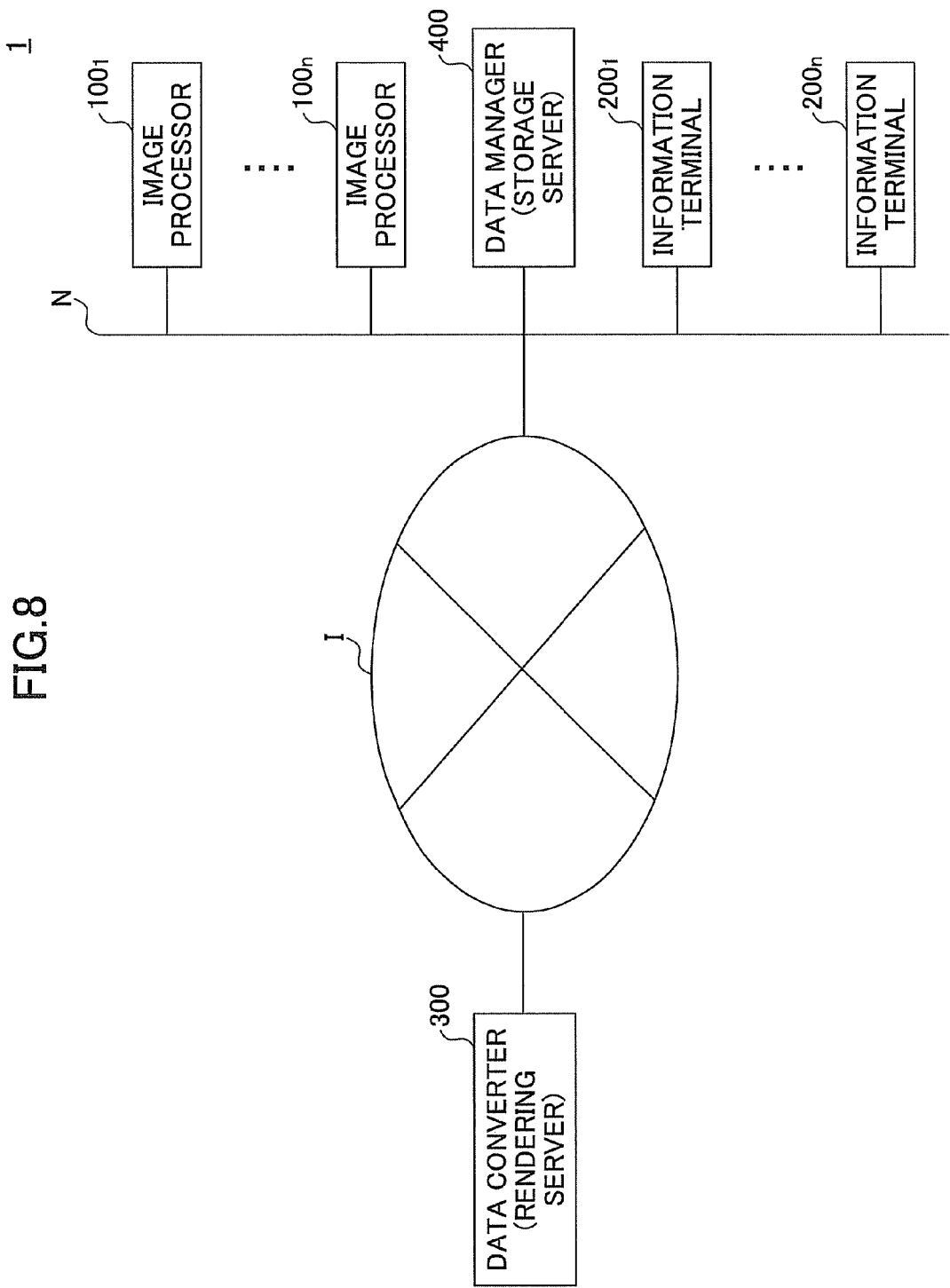
FIG. 8 is a diagram illustrating a configuration of the printing control system according to a second embodiment of the present invention.

FIG. 8 is a diagram illustrating a configuration of the printing control system 1 according to this embodiment.

Referring to FIG. 8, the printing control system 1 according to this embodiment includes a data manager 400. The data manager 400 is connected to the internal network N to which the image processor 100 and the information terminal 200 are connected.

The data manager 400, which has a data management function to store received data in a predetermined storage area in response to receiving a storage request and manage the stored data, may be a storage server.

According to the above-described system configuration, the printing control system 1 according to this embodiment provides the following printing service.

A user transmits application data (print source data) from the information terminal 200 to the data manager 400, and requests the data manager 400 to store a job to be printed. Later, from the information terminal 200, the user requests the data manager 400 to obtain a job list, and selects a print job from the job list displayed on the screen. As a result, information indicating the storage destination of the selected job data (application data) in the data manager 400 (hereinafter referred to as "storage destination information") is transmitted from the information terminal 200 to the image processor 100, and the image processor 100 is requested to obtain the job data.

In response, the image processor 100 requests the data manager 400 to obtain the selected job data based on the storage destination information, and transmits the data obtained from the data manager 400 to the data converter 300 and requests the data converter 300 to convert the data into print data. At this point, the image processor 100 specifies a printable data format to the data converter 300.

As a result, the data converter 300 converts the received data into print data according to the specified data format, and responds to the data conversion request by transmitting the converted data to the requesting image processor 100. In response, the image processor 100 prints the converted data (print data) received from the data converter 300.

[Printing Control Function]

FIG. 9 is a block diagram illustrating a configuration of a printing control function according to this embodiment.

Referring to FIG. 9, the printing control function according to this embodiment includes a list display part 22 and a data management part 41. The list display part 22 operates in the information terminal 200, and the data management part 41 operates in the data manager 400.

In the following, a description is given, in order of the data manager 400, the information terminal 200, and the image processor 100, of functional parts that are different from those of the first embodiment.

[Data Manager]

The data management part 41 is a functional part that manages data retained in the data manager 400. The data manager 400 retains, in a data management information retaining part 80, data received from an external device or apparatus (such as an "information terminal") at the time of receiving a storage request. The data received at this point are, for example, application data, and are data before being converted into print data. Further, the data management information retaining part 80 corresponds to a predetermined storage area of a storage device of the data manager 400.

The data management part 41 manages data based on data management information containing one or more information sets in which, for example, the identification information of received data (hereinafter referred to as "data identification information"), information on a user who is the owner of the received data (hereinafter referred to as "user information"), and the storage destination information of the received data are correlated with one another on a received data basis.

In response to receiving a storage request, the data management part 41 stores received data in a predetermined storage area. At this point, the data management part 41 accesses the data management information retaining part 80 to record an identifier assigned to the received data as data identification information. The data management part 41 records the identifier of the user (such as a "user ID" or "username") as user information. The data management part 41 records an access path (a uniform resource identifier [URI]) to the stored received data as storage destination information. The data management part 41 updates the data management information in this manner.

Further, in response to receiving a request to obtain a job list, the data management part 41 accesses the data management information retaining part 80, and identifies one or more information sets containing user information corresponding to the requestor from among the data management information based on the user information at the time of the obtaining request. Then, the data management part 41 generates the job list data of the requestor based on the identified information sets. As a result, the data management part 41 transmits the generated job list data to the requestor (requesting information terminal).

Further, in response to receiving a request to obtain job data (a job data obtaining request), the data management part 41 accesses the data management information retaining part 80, and obtains selected job data based on the storage destination information at the time of the obtaining request. As a result, the data management part 41 transmits the obtained selected job data to the requestor (requesting image processor).

[Information Terminal]

The list display part 22 is a functional part that displays the job list of a user. The list display part 22 transmits user information to the data manager 400, and requests the data manager 400 to obtain a job list. As a result, the list display part 22 displays, on the screen of the information terminal 200, job list data received from the data manager 400 when the data manager 400 responds. At this point, the list display part 22 displays an operation screen with a GUI that allows the user to select a print job from the displayed job list and to request the printing of the selected print job.

The list display part 22 receives the operation instructions of a job data obtaining request from the user including the selection of a job and the specification of a print destination based on the operation events of the GUI. In response to receiving the operation instructions from the user, the list display part 22 specifies storage destination information corresponding to the selected job among the storage destination information contained in the job list data, and passes the specified storage destination information to the transmission part 21 and instructs the transmission part 21 to request the image processor 100 specified as a print destination to obtain job data. As a result, the transmission part 21 transmits the storage destination information of the selected job to the image processor 100.

[Image Processor]

The image processor 100 has the data analysis part 12 analyze received data and has the format determining part 13 determine the data format of the received data. At this point, the format determining part 13 determines whether the received data are in the data format of a job data obtaining request based on the result of a storage destination information presence/absence analysis. At this point, the format determining part 13 determines that the received data are an instruction to request the obtaining of job data if the received data contain storage destination information. In the storage destination information presence/absence analysis by the data analysis part 12, the data analysis part 12 analyzes the received data to determine whether the received data contain data on a URI, which is an access path to the job data.

As a result, if the received data are an instruction to request the obtaining of job data, the image processor 100 requests the data manager 400 to obtain selected job data based on the storage destination information, and has the reception part 11 receive the requested data. Thereby, the image processor 100 obtains application data corresponding to the selected job retained in a predetermined storage area in the storage device of the data manager 400 (the data management information retaining part 80).

Thereafter, in the image processor 100, the data received from the data manager 400 are analyzed, and the data format of the received data is determined based on the result of the analysis. If it is determined as a result of the analysis that the received data are convertible application data, the received data are transmitted to the data converter 300 and are requested to be converted into print data.

Thus, the printing control function according to this embodiment is implemented by the above-described functional parts operating in conjunction with one another. For example, the printing control function according to this embodiment is implemented by reading a program (software implementing the printing control function) installed in each of the apparatuses (100, 200, 300) of the printing control system 1 from a storage device (such as an HDD or a ROM) into a memory (RAM) and executing the program by a processor (CPU) so that the following process is executed in the apparatuses.

A description is given below, with reference to a flowchart illustrating an operating procedure, of a detailed operation (a conjunct operation of a group of functional parts) of the printing control function according to this embodiment.

Figure 10A:
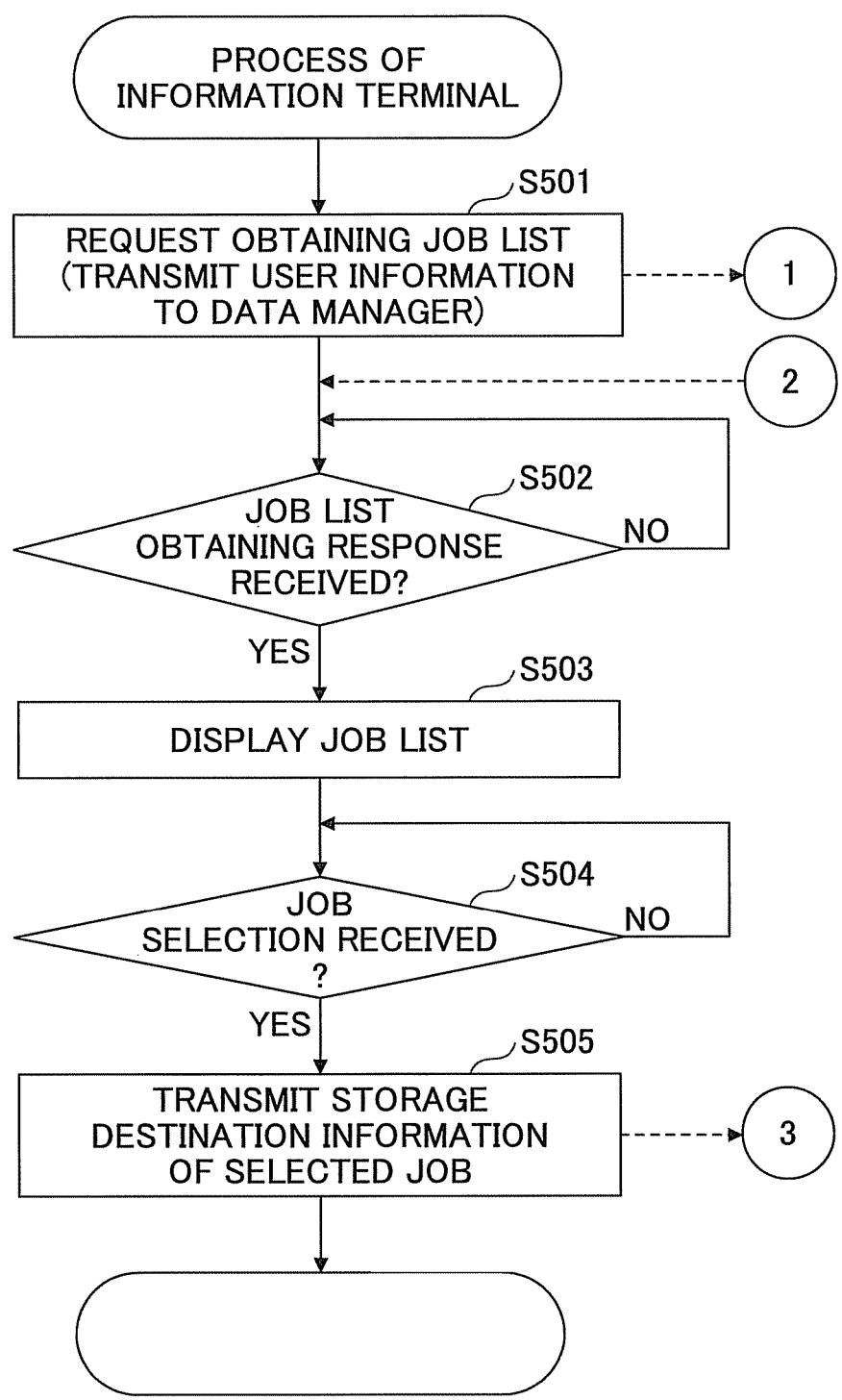
Figure 10B:
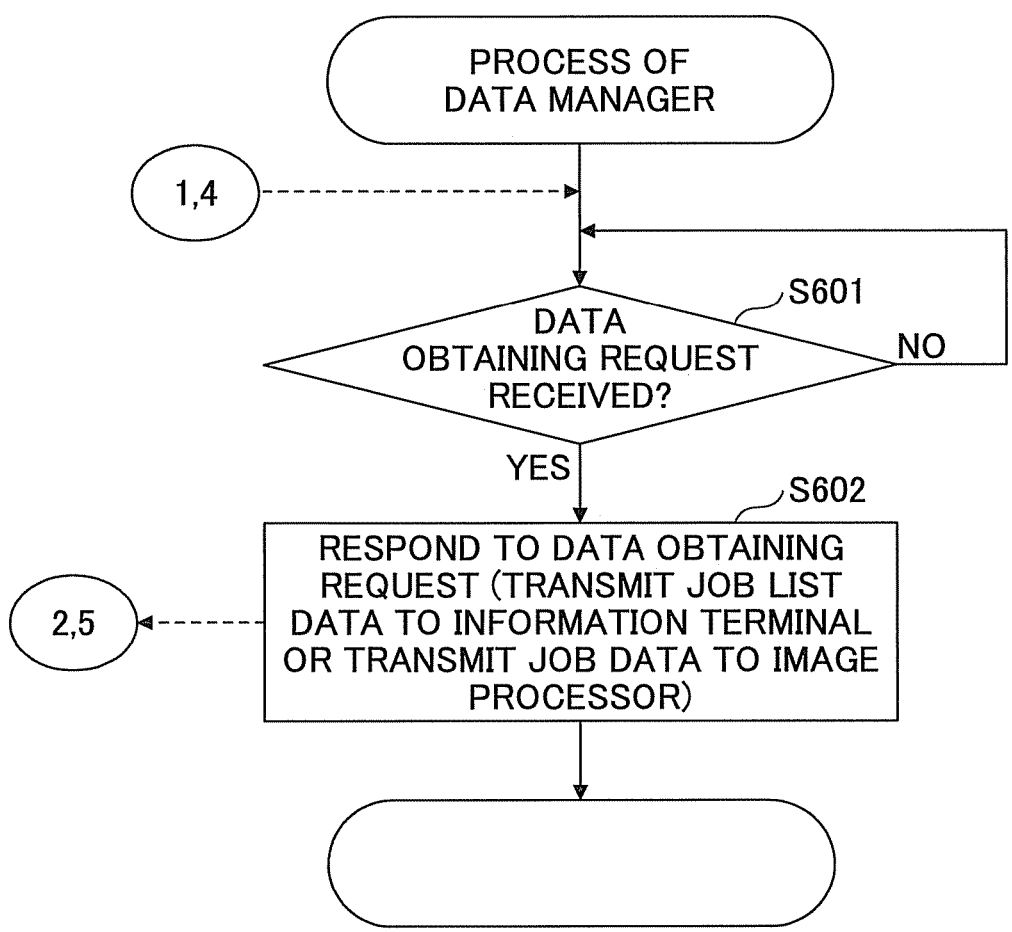

FIGS. 10A, 10B, and 10C are flowcharts illustrating an operating procedure of printing control according to this embodiment.

FIG. 10A illustrates a process of the information terminal 200 in printing control, FIG. 10B illustrates a process of the data manager 400 in printing control, and FIG. 10C illustrates a process of the image processor 100 in printing control. The process of the data converter 300 in printing control is the same as the process of steps S301 through S303 illustrated in FIG. 4C described in the first embodiment, and accordingly, a description thereof is omitted.

[Process of Information Terminal]

Referring to FIG. 10A, in step S501, the information terminal 200 has the list display part 22 request the data manager 400 to obtain the job list of a user (a job list obtaining request). At this point, the list display part 22 transmits user information to the data manager 400.

Thereafter, in step S502, the information terminal 200 receives a job list obtaining response from the data manager 400. At this point, the list display part 22 receives the job list data of the user from the data manager 400.

In response, in step S503, the information terminal 200 has the list display part 22 display the job list data on the screen.

Thereafter, the information terminal 200 receives the selection of a print job on the operation screen (YES in step S504).

In response, in step S505, the information terminal 200 has the transmission part 21 transmits storage destination information corresponding to the selected job (an access path to the selected job data) included in the job list data to the image processor 100 specified as a print destination.

Thereby, in the printing control system 1 according to this embodiment, the information terminal 200 requests the image processor 100 to perform printing.

[Process of Data Manager]

Referring to FIG. 10B, the data manager 400 receives a data obtaining request from the information terminal 200 or the image processor 100 (YES in step S601). At this point, the data management part 41 determines, based on the information type contained in the received data, whether the received data obtaining request is a job list obtaining request or a job data obtaining request. For example, if the received data contain user information, it is determined that the received data obtaining request is a job list obtaining request. If the received data contain storage destination information (an access path or URI), it is determined that the received data obtaining request is a job data obtaining request.

In response, in step S602, the data manager 400 responds to the requestor by having the data management part 41 access the data management information retaining part 80 and transmit requested data to the information terminal 200 or the image processor 100. At this point, in the case of receiving a job list obtaining request, the data management part 41 identifies the data management information of the requestor (user) based on the user information at the time of receiving the data obtaining request, generates the job list data of the requestor (user) based on the identified data management information, and transmits the generated job list data to the requestor (the information terminal 200). In the case of receiving a job data obtaining request, the data management part 41 obtains selected job data retained in a predetermined storage area based on the storage destination information at the time of receiving the data obtaining request, and transmits the obtained selected job data to the requestor (the image processor 100).

Thereby, in the printing control system 1 according to this embodiment, a job stored in an external storage area (data manager) by a user may also be a job to be printed.

[Process of Image Processor]

Referring to FIG. 10C, in response to receiving data transmitted from the information terminal 200 or the data converter 300 by the reception part 11 (YES in step S701), in step S702, the image processor 100 has the data analysis part 12 analyze the received data. At this point, the data analysis part 12 analyzes the extension and the header of the received data file.

Then, in step S703, the image processor 100 has the format determining part 13 determine whether the received data are an instruction to request the obtaining of job data based on the result of the storage destination information presence/absence analysis of the data analysis part 12.

As a result, if the received data contain storage destination information (an access path or URI) and it is determined that the received data are an instruction to make a job data obtaining request (YES in step S703), in step S707, the image processor 100 requests the data manager 400 to obtain selected job data. At this point, the image processor 100 transmits the storage destination information contained in the received data to the data manager 400.

Thereafter, the image processor 100 proceeds to the above-described process of step S701 to enter the state of waiting for a response to the request from the data manager 400 (the state of waiting for reception of the requested data (job data) from the data manager 400).

On the other hand, if it is determined that the received data contain no storage destination information so that the received data are not an instruction to make a job data obtaining request (NO in step S703), in step S704, the image processor 100 has the format determining part 13 determine whether the received data are application data based on the result of the extension presence/absence analysis of the analysis part 12.

As a result, if it is determined that the received data do not include an extension and are accordingly not application data (that is, the received data are print data) (NO in step S704), in step S705, the image processor 100 has the executability determining part 15 determine whether the print data as determined are printable data based on the result of the header analysis of the data analysis part 12. At this point, the executability determining part 15 executes the above-described executability (printability) determination based on the result of the header analysis as to whether the header of the received data determined as print data includes predetermined data of "%-12345x."

As a result, if it is determined that the header of the received data determined as print data include "%-12345X" and that the print data are printable data (YES in step S705), in step S706, the image processor 100 has the printing control part 16 perform a process for printing the print data. At this point, the printing control part 16 passes the received data determined as print data to the plotter 130, and instructs the plotter 130 to perform printing. As a result, the plotter 130 forms an image based on the received data and prints the image in accordance with preset printing condition settings.

On the other hand, if it is determined in step S704 that the received data include an extension and are accordingly application data (YES in step S704), in step S708, the image processor 100 has the format determining part 13 determine, based on the result of the extension type analysis of the data analysis part 12, whether the application data are in a data format convertible in the data converter 300. At this point, the format determining part 13 executes the above-described convertible format determination based on the result of the determination as to whether the extension matches an extension set in the preset convertible format information (list data of one or more extensions indicating convertible data formats), referring to the convertible format information based on the analyzed extension.

As a result, if it is determined that the analyzed extension is an extension set in the convertible format information so that the received data determined as application data are in a convertible data format (YES in step S708), in step S709, the information processor 100 has the conversion requesting part 14 transmit the received data determined as convertible application data to the data converter 300 and request the data converter 300 to convert the application data into print data. At this point, the conversion requesting part 14 also transmits the PDL type value of the image processor 100, thereby notifying the data converter 300 of information on a data format printable in the image processor 100.

Thereafter, the image processor 100 proceeds to the above-described process of step S701, and enters the state of waiting for a response to the request from the data converter 300 (the state of waiting for reception of converted data (print data) from the data converter 300).

If it is determined as a result of step S705 that the header of the received data determined as print data does not include predetermined data of "%-12345X" and that the print data are not printable data (NO in step S705), or if it is determined as a result of step S708 that the analyzed extension is not an extension set in the convertible format information so that the received data determined as application data are not in a data format convertible in the data converter 300 (NO in step S708), in step S710, the image processor 100 executes a predetermined error process. Here, the predetermined error process is, for example, to notify the requesting information terminal 200 (that has requested printing) of the details of the error.

Thereby, according to the printing control system 1 of this embodiment, in response to receiving a selected job data obtaining request from the information terminal 200, the selected job data are obtained from the data manager 400, the data format of the received data (job data) is determined, and a process for converting the received data into print data (a rendering process) is controlled based on the result of the determination in the image processor 100.

Thus, the printing control system 1 according to this embodiment provides an environment where a stored job specified from the information terminal 200 having no data conversion function may be printed in the image processor 100.

[Variation]

According to the printing control system 1 of the second embodiment, the following service may be provided in view of improving convenience. For example, print data generated in the data converter 300 are stored in an external storage area, and next time the same job is subjected to printing (hereinafter referred to as "reprinting"), the stored print data are used. As a result, conversion into print data may not be performed at every printing request, so that efficient reprinting is achieved.

Therefore, according to a variation of the second embodiment, a mechanism is provided for the image processor 100 storing print data received from the data converter 300 in an external storage area.

Thereby, according to this variation, an environment is provided where it is possible from the information terminal 200 having no data conversion function to cause print data, which are once converted data, to be printed in the image processor 100. As a result, according to the printing control system 1 of this embodiment, a user may perform location-free printing with a data conversion function that depends on a print destination being transparent to the user, and may efficiently perform reprinting.

In the following, a description is given of differences from the above-described embodiment. The same elements as those described above are referred to by the same reference numerals, and a description thereof is omitted.

[Printing Control Function]

FIG. 11 is a block diagram illustrating a configuration of a printing control function according to the variation.

Referring to FIG. 11, the printing control function according to this variation is different from the above-described second embodiment in that the printing control part 16 transmits print data to the data manager 400 and requests the data manager 400 to store the data.

The printing control part 16 passes received data determined as printable print data by the executability determination part 15 to the plotter 130 (FIG. 2) of the image processor 100, and instructs the plotter 130 to execute printing. At this point, the printing control part 16 transmits the print data to the data manager 400 and requests the data manager 400 to store the print data.

Further, at the time of transmitting the print data, the printing control part 16 also transmits the storage destination information (the data received from the information terminal 200 when receiving a job data obtaining request) of selected job data (application data) that are the pre-conversion data of the print data to the data manager 400. As a result, the data manager 400 stores the print data in a predetermined storage area. At this point, the data management part 41 accesses the data management information retaining part 80, and based on the storage destination information at the time of receiving the storage request, the data management part 41 identifies an information set including the storage destination information from among the data management information. Then, the data management part 41 records the storage destination information of the print data in the identified information set. That is, in the data manager 400, pre-conversion data and converted data are managed in correlation with each other.

This allows the information terminal 200 to receive job list data including the storage destination information of print data from the data manager 400 and to display an operation screen that enables a user to select print data. Accordingly, in the image processor 100, when receiving a job data obtaining request from the information terminal 200, it is possible to receive the storage destination information of the print data selected by the user and to obtain the print data from the data manager 400.

Thus, according to the printing control system 1 of this variation, conversion into print data may not be performed at every printing request. According to the printing control system 1 of this variation, conversion into print data may be performed only when data (application data) that require data conversion are received.

The above description is given of the case of transmitting print data to the data manager 400, which, however, is a non-limiting configuration. For example, print data may be transmitted to the requesting information terminal 200, and in the image processor 100, the transmission of print data may be controlled in accordance with the specification of a transmission destination by a user. In this case, the image processor 100 receives the specification of a transmission destination when receiving a job data obtaining request including the selection of a job and the specification of a print destination from the information terminal 200.

A description is given below, with reference to a flowchart illustrating an operating procedure, of a detailed operation (a conjunct operation of a group of functional parts) of the printing control function according to this variation.

Figure 12A:
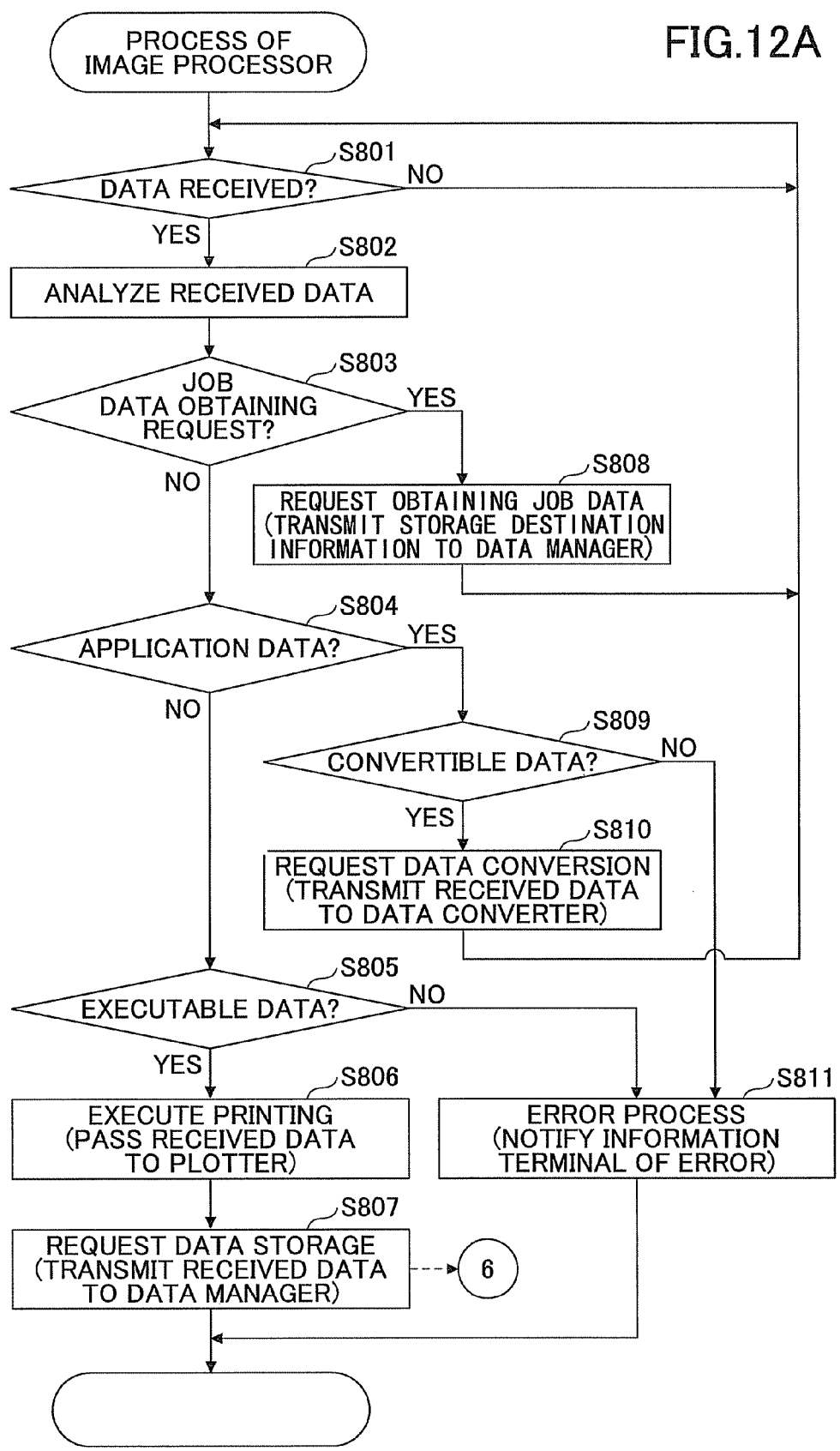

FIGS. 12A and 12B are flowcharts illustrating an operating procedure of printing control according to this variation.

FIG. 12A illustrates a process of the image processor 100 in printing control, and FIG. 12B illustrates a process of the data manager 400 in printing control.

The process of the information terminal 200 in printing control is the same as the process of steps S501 through S505 illustrated in FIG. 10A described in the second embodiment. Further, the process of the data converter 300 in printing control is the same as the process of steps S301 through S303 illustrated in FIG. 4C described in the first embodiment. Accordingly, a description thereof is omitted.

Further, the process of steps S801 through S806 and S808 through S811 illustrated in FIG. 12A is the same as the process of steps S701 through S706 and S707 through S710 illustrated in FIG. 10C described in the above embodiment. Accordingly, a description is given below of a different operating procedure (the process of step S807).

[Process of Image Processor]

Referring to FIG. 12A, in step S806, the image processor 100 has the printing control part 16 perform a process for printing print data. As a result, the plotter 130 forms an image based on received data and prints the image in accordance with preset printing condition settings.

Thereafter, in step S807, the image processor 100 requests the data manager 400 to store the print data subjected to printing. At this point, the printing control part 16 transmits the print data to the data manager 400 and also transmits selected job data (application data) that are the pre-conversion data of the print data.

Thereby, in the printing control system 1 of this variation, the image processor 100 requests an external storage device to store print data.

[Process of Data Manager]

Referring to FIG. 12B, the data manager 400 receives a data storage request from the image processor 100 (YES in step S901).

In response, in step S902, the data manager 400 has the data management part 41 access the data management information retaining part 80 and store the received data in the storage device. At this point, the data management part 41 stores the received print data in a predetermined storage area, and based on the storage destination information at the time of receiving the storage request, the data management part 41 identifies data management information including the storage destination information. Then, the data management part 41 newly records the storage destination information of the print data in the identified data management information.

Thereby, in the printing control system 1 according to this variation, print data, which are data once converted by the data converter 300, are stored in an external storage area.

Thus, according to the printing control system 1 of this embodiment, the image processor 100 has the data analysis part 12 analyze data received from the information terminal 200 and has the format determining part 13 determine the data format of the received data. If it is determined that the received data are in the data format of a job data obtaining request, the image processor 100 requests the data manager 400 to obtain the job data selected in the information terminal 200 based on the storage destination information received at the time of receiving the job data obtaining request. As a result, the image processor 100 receives a response to the job data obtaining request from the data manager 400.

In response, if it is determined that the job data, which are received data, are in a data format convertible into print data printable in the image processor 100, the image processor 100 has the conversion requesting part 14 transmit the received data to the data converter 300 and request the data converter 300 to convert the received data into print data. As a result, the image processor 100 has the printing control part 16 perform a process for printing the print data received when the data converter 300 responds to the (data conversion) request.

This allows the printing control system 1 according to this embodiment to provide an environment where a stored job specified from the information terminal 200 having no data conversion function may be printed in the image processor 100, so that a user may also perform location-free printing on the job stored in an external storage area with a data conversion function that depends on a print destination being transparent to the user.

A description is given above of embodiments of the present invention. The "printing control functions" according to the above-described embodiments may be implemented by executing a program into which the operating procedures described with reference to the drawings are coded with a programming language suitable for an operating environment (platform) by the processors (CPUs) of the apparatuses or devices (such as an "information terminal," an "image processor," a "data converter," and/or a "data manager") of the printing control system 1 so that the apparatuses operate in conjunction with one another.

This program may be stored (recorded) in the computer-readable recording medium 114a (FIG. 2). Thereby, for example, in the case of the image processor 100, the program may be installed in the image processor 100 via the external device I/F 114 (FIG. 2). Further, since the image processor 100 includes the communications I/F 113, the program may be downloaded using a telecommunications line to be installed in the image processor 100 via the communications I/F 113.

Further, in the above-described embodiments, a description is given of a configuration where the image processor 100 determines the data converter 300 to request to perform conversion into print data in an environment where data conversion workload is distributed. In this case, the image processor 100 may operate as follows. After requesting data conversion, the image processing 100 waits for a response (reception of print data) from the data converter 300. At this point, if no response is received from the destination data converter 300 within a preset predetermined period, the image processor 100 requests another data converter 300 capable of data conversion into print data printable in the image processor 100. Further, if an error is returned from the destination data converter 300, the image processor 100 requests another data converter 300 to perform data conversion, thereby recovering a data conversion process. This makes it possible to provide a reliable printing service.

Further, the method of recovering a data conversion process in an environment where data conversion workload is distributed may also be implemented by the cooperation of multiple data converters 300. For example, it is assumed that a data converter 300 detects an error and determines that the data converter 300 is prevented from responding normally to the conversion request of the requesting image processor 100. In this case, the data converter 300 requests another data converter 300 capable of data conversion into print data printable in the image processor 100 based on the PDL type value received from the image processor 100 at the time of receiving the conversion request. At this point, the requesting data converter 300 transmits the data and the PDL type value received at the time of receiving the conversion request and also the network configuration value of the image processor 100 that is a response destination to the data converter 300 that is a request destination.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority or inferiority of the invention. Although one or more embodiments of the present invention have been described in detail, it should be understood that the various changes, substitutions, and alterations could be made hereto without departing from the spirit and scope of the invention.

What is claimed is:

1. A printing control system, comprising:
   a transmission part, at an information terminal, configured to transmit print request data to an image processor;
   an analysis part, at the image processor, configured to analyze the print request data received from the information terminal;
   a request determining part, at the image processor, configured to determine, based on a result of analysis by the analysis part, whether the print request data have requested printing of data included in the print request data or have requested acquisition of data based on storage destination information thereof included in the print request data and printing of the acquired data;

a data acquisition part, at the image processor, configured to acquire the data stored in a storage based on the storage destination information in response to the request determining part determining that the print request data have requested the acquisition of the data;

a format determining part, at the image processor, configured to determine whether a data format of the data included in the print request data or acquired from the storage is printable in the image processor without conversion based on the result of analysis by the analysis part, and to determine whether the data format of the included or acquired data is convertible into a printable format printable in the image processor in response to determining that the data format of the included or acquired data is not printable in the image processor without conversion;

a conversion requesting part, at the image processor, configured to, in response to the format determining part determining that the data format of the included or acquired data is convertible into the printable format, transmit the included or acquired data to a data converter and request the data converter to convert the data format of the included or acquired data into the printable format; and a printing control part, at the image processor, configured to print the data included in the print request data in response to the format determining part determining that the data format of the included data is printable in the image processor without conversion, or to print the included or acquired data of the converted data format returned from the data converter, wherein the analysis by the analysis part includes determining a presence or absence of the storage destination information in the received print request data and includes determining a presence or absence of an extension of the received print request data, wherein the request determining part is configured to determine that the print request data have requested the printing of the data included in the print request data in response to the analysis by the analysis part determining the absence of the storage destination information in the received print request data, and to determine that the print request data have requested the acquisition and the printing of the data in response to the analysis by the analysis part determining the presence of the storage destination information in the received print request data, wherein the format determining part is configured to determine whether the data format of the data included in the print request data is printable in the image processor without conversion based on the presence or absence of the extension of the received print request data determined by the analysis by the analysis part in response to the request determining part determining that the print request data have requested the printing of the data included in the print request data, and to determine that the data format of the data included in the print request data is printable in the image processor without conversion in response to the absence of the extension of the received print request data, and wherein the conversion requesting part is configured to determine a plurality of data converters in which the data format of the included or acquired data are convertible into the printable format printable in the image processor and to transmit a request for information to the determined plurality of data converters, and to obtain and compare values of processing workloads of the determined plurality of data converters and determine said data converter as a data converter to request to convert the data format of the included or acquired data into the printable format printable in the image processor when said data converter has the lowest processing workload among the determined plurality of data converters.

2. The printing control system as claimed in claim 1, wherein:
the format determining part is configured to determine that the data format of the included data is a data format of application data in response to the presence of the extension of the print request data.

3. The printing control system as claimed in claim 2, wherein the format determining part is configured to determine that the data format of the included data is a data format of print data in response to the absence of the extension of the print request data.

4. The printing control system as claimed in claim 3, further comprising:
an executability determining part, at the image processor, configured to determine whether the included data determined as the print data are printable in the image processor in response to the format determining part determining that the data format of the included data is the data format of the print data,
wherein the analysis part is configured to analyze a header of the print request data, and
the executability determining part is configured to determine that the included data determined as the print data are printable in the image processor in response to the analysis part determining that predetermined data are included in the header of the print request data as a result of analyzing the header.

5. The printing control system as claimed in claim 2, wherein the format determining part is configured to determine whether the data format of the application data is convertible into the printable format in response to determining that the data format of the included data is the data format of the application data.

6. The printing control system as claimed in claim 5, wherein the format determining part is configured to determine whether the data format of the application data is convertible into the printable format based on preset convertible format information indicating one or more data formats convertible into the printable format.

7. The printing control system as claimed in claim 6, wherein the format determining part is configured to determine that the data format of the application data is convertible into the printable format in response to determining that an extension of the application data matches an extension set as the convertible format information.

8. The printing control system as claimed in claim 1, further comprising:
a list display part, at the information terminal, configured to obtain a job list from a data manager and display the job list on a screen of the information terminal, the data manager storing job data in a predetermined storage area and managing the job data,
wherein the transmission part is configured to transmit storage destination information of the job data selected from the job list displayed on the screen by the list display part to the image processor, and to request the image processor to obtain the job data, the format determining part is configured to determine whether a data format of the job data obtained from the data manager based on the storage destination information is convertible into the printable format, the conversion requesting part is configured to transmit the job data to the data converter and request the data converter to convert the data format of the job data into the printable format in response to the format determining part determining that the data format of the job data is convertible into the printable format, and the printing control part is configured to print the job data of the converted data format returned from the data converter.

9. A printing control method, comprising:

transmitting print request data from an information terminal to an image processor;

analyzing the print request data received from the information terminal;

determining, based on a result of the analyzing, whether the print request data have requested printing of data included in the print request data or have requested acquisition of data based on storage destination information thereof included in the print request data and printing of the acquired data;

acquiring the data stored in a storage based on the storage destination information in response to determining that the print request data have requested the acquisition of the data;

determining whether a data format of the data included in the print request data or acquired from the storage is printable in the image processor without conversion based on the result of the analyzing, and determining whether the data format of the included or acquired data is convertible into a printable format printable in the image processor in response to determining that the data format of the included or acquired data is not printable in the image processor without conversion;

transmitting, in response to determining that the data format of the included or acquired data is convertible into the printable format, the included or acquired data to a data converter and requesting the data converter to convert the data format of the included or acquired data into the printable format; and printing the data included in the print request data in response to determining that the data format of the included data is printable in the image processor without conversion, or printing the included or acquired data of the converted data format returned from the data converter, wherein said analyzing includes determining a presence or absence of the storage destination information in the received print request data and includes determining a presence or absence of an extension of the received print request data, wherein it is determined that the print request data have requested the printing of the data included in the print request data in response to said analyzing determining the absence of the storage destination information in the received print request data, and it is determined that the print request data have requested the acquisition and the printing of the data in response to said analyzing determining the presence of the storage destination information in the received print request data, wherein it is determined whether the data format of the data included in the print request data is printable in the image processor without conversion based on the presence or absence of the extension of the received print request data determined by said analyzing in response to determining that the print request data have requested the printing of the data included in the print request data, and it is determined that the data format of the data included in the print request data is printable in the image processor without conversion in response to the absence of the extension of the received print request data, and wherein a plurality of data converters in which the data format of the included or acquired data are convertible into the printable format printable in the image processor is determined and a request for information is transmitted to the determined plurality of data converters, and values of processing workloads of the determined plurality of data converters are obtained and compared and said data converter is determined as a data converter to request to convert the data format of the included or acquired data into the printable format printable in the image processor when said data converter has the lowest processing workloads among the determined plurality of data converters.

10. An image processor, comprising:

an analysis part configured to analyze print request data received from an information terminal;

a request determining part configured to determine, based on a result of analysis by the analysis part, whether the print request data have requested printing of data included in the print request data or have requested acquisition of data based on storage destination information thereof included in the print request data and printing of the acquired data;

a data acquisition part configured to acquire the data stored in a storage based on the storage destination information in response to the request determining part determining that the print request data have requested the acquisition of the data;

a format determining part configured to determine whether a data format of the data included in the print request data or acquired from the storage is printable in the image processor without conversion based on the result of analysis by the analysis part, and to determine whether the data format of the included or acquired data is convertible into a printable format printable in the image processor in response to determining that the data format of the included or acquired data is not printable in the image processor without conversion;

a conversion requesting part configured to, in response to the format determining part determining that the data format of the included or acquired data is convertible into the printable format, transmit the included or acquired data to a data converter and request the data converter to convert the data format of the included or acquired data into the printable format; and a printing control part configured to print the data included in the print request data in response to the format determining part determining that the data format of the included data is printable in the image processor without conversion, or to print the included or acquired data of the converted data format returned from the data converter, wherein the analysis by the analysis part includes determining a presence or absence of the storage destination information in the received print request data and includes determining a presence or absence of an extension of the received print request data, wherein the request determining part is configured to determine that the print request data have requested the printing of the data included in the print request data in response to the analysis by the analysis part determining the absence of the storage destination information in the received print request data, and to determine that the print request data have requested the acquisition and the printing of the data in response to the analysis by the analysis part determining the presence of the storage destination information in the received print request data, wherein the format determining part is configured to determine whether the data format of the data included in the print request data is printable in the image processor without conversion based on the presence or absence of the extension of the received print request data determined by the analysis by the analysis part in response to the request determining part determining that the print request data have requested the printing of the data included in the print request data, and to determine that the data format of the data included in the print request data is printable in the image processor without conversion in response to the absence of the extension of the received print request data, and wherein the conversion requesting part is configured to determine a plurality of data converters in which the data format of the included or acquired data are convertible into the printable format printable in the image processor and to transmit a request for information to the determined plurality of data converters, and to obtain and compare values of processing workloads of the determined plurality of data converters and determine said data converter as a data converter to request to convert the data format of the included or acquired data into the printable format printable in the image processor when said data converter has the lowest processing workload among the determined plurality of data converters.

* * * * *